United States Patent
Illsley et al.

(10) Patent No.: US 11,359,102 B2
(45) Date of Patent: *Jun. 14, 2022

(54) UV-CURABLE COMPOSITIONS COMPRISING CLEAVAGE TYPE PHOTOINITIATORS

(71) Applicant: SUN CHEMICAL CORPORATION, Parsippany, NJ (US)

(72) Inventors: Derek Ronald Illsley, Frome (GB); Shaun Lawrence Herlihy, Glastonbury (GB); Andrew Boon, Orpington (GB)

(73) Assignee: Sun Chemical Corporation, Parsippany, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/981,553

(22) PCT Filed: Aug. 6, 2018

(86) PCT No.: PCT/US2018/045320
§ 371 (c)(1),
(2) Date: Sep. 16, 2020

(87) PCT Pub. No.: WO2019/190585
PCT Pub. Date: Oct. 3, 2019

(65) Prior Publication Data
US 2021/0301157 A1    Sep. 30, 2021

Related U.S. Application Data

(60) Provisional application No. 62/648,471, filed on Mar. 27, 2017.

(51) Int. Cl.
| | |
|---|---|
| C08F 2/46 | (2006.01) |
| C08F 2/50 | (2006.01) |
| C08G 61/04 | (2006.01) |
| C09D 11/101 | (2014.01) |
| C09D 11/38 | (2014.01) |
| C09D 147/00 | (2006.01) |

(52) U.S. Cl.
CPC ............ C09D 11/101 (2013.01); C09D 11/38 (2013.01); C09D 147/00 (2013.01)

(58) Field of Classification Search
CPC ...... C09D 11/101; C09D 11/38; C09D 147/00
USPC ............... 522/8, 7, 6, 189, 184, 71, 1; 520/1
See application file for complete search history.

(56) References Cited

U.S. PATENT DOCUMENTS

| | | | |
|---|---|---|---|
| 8,507,726 B2 | 8/2013 | Studer et al. | |
| 9,394,461 B2 | 7/2016 | Croutxe-Barghorn et al. | |
| 9,605,180 B2 | 3/2017 | Illsley et al. | |
| 2004/0132862 A1* | 7/2004 | Woudenberg | C09D 11/34 523/160 |
| 2012/0287213 A1* | 11/2012 | Engel | C09D 11/101 347/102 |
| 2015/0291818 A1 | 10/2015 | Kida et al. | |
| 2017/0015856 A1 | 1/2017 | Illsley et al. | |
| 2017/0130057 A1 | 5/2017 | Hamano et al. | |
| 2017/0198156 A1* | 7/2017 | Lawrence | C09D 11/101 |
| 2017/0204282 A1 | 7/2017 | Illsley et al. | |
| 2018/0022949 A1 | 1/2018 | Masashi | |
| 2018/0272595 A1* | 9/2018 | Yudovin-Farber | B33Y 10/00 |
| 2021/0115273 A1* | 4/2021 | Illsley | C09D 11/38 |

FOREIGN PATENT DOCUMENTS

| | | | |
|---|---|---|---|
| CN | 102492330 | 6/2012 | |
| CN | 102964968 | 3/2013 | |
| EP | 2302007 | 3/2011 | |
| EP | 3275950 A1 * | 1/2018 | ............ C09D 11/38 |
| EP | 3275950 A1 | 1/2018 | |
| WO | WO 2007/017298 | 2/2007 | |
| WO | WO 2007/017348 | 2/2007 | |
| WO | WO-2019032425 A1 * | 2/2019 | ............ B41M 5/50 |

OTHER PUBLICATIONS

International Search Report issued in International Application No. PCT/US2018/045320, dated Oct. 19, 2018.
Written Opinion of the International Searching Authority issued in International Application No. PCT/US2018/045320, dated Oct. 19, 2018.
International Preliminary Report on Patentability (Chapter II of the Patent Cooperation Treaty) issued in International Application No. PCT/US2018/045320, dated Apr. 2, 2020.
Bailey, Ph.D., Susan E., "Raw Material Strategies for Food Packaging Compliance." May 22, 2016. https://uvebtech.corrilarticles/2016/raw-material-strateaies-for-food-packaging-compliance/.

* cited by examiner

*Primary Examiner* — Jessica Whiteley
(74) *Attorney, Agent, or Firm* — Marian E. Fundytus; Ostrolenk Faber LLP.

(57) ABSTRACT

The present invention is drawn to UV-curable ink and coating compositions comprising cleavage type photoinitiators and acids. The acids may be inorganic or organic acids, or acids generated by a photoacid generator during UV-cure. Incorporation of the acids into the UV-curable ink and coating compositions results in a reduction of migratable photodecomposition products that are produced by cleavage type photoinitiators during UV-cure. The ink and coating compositions are particularly useful for use in applications that require low migration of low molecular weight materials, such as, for example, food packaging.

16 Claims, No Drawings

UV-CURABLE COMPOSITIONS COMPRISING CLEAVAGE TYPE PHOTOINITIATORS

CROSS REFERENCE TO RELATED APPLICATIONS

The present application is a § 371 National Phase application based on PCT/US2018/045320 filed Aug. 6, 2018, which claims the benefit of U.S. Provisional Application No. 62/648,471, filed Mar. 27, 2018 the subject matter of each of which is incorporated by reference in their entirety.

FIELD OF THE INVENTION

The present invention is related to UV-curable ink and coating compositions that are suitable for applications that require reduced migration of contaminants from the cured coating. Advantageously, the amount of certain photodecomposition products (e.g. aldehyde) produced by a cleavage type photoinitiator during UV-cure of the ink or coating compositions is reduced by incorporation of an acid into the compositions.

BACKGROUND OF THE INVENTION

Energy curable inks and coatings are often used in the printing of food packaging, pharmaceutical packaging, personal care and household packaging, display boards in supermarkets, etc. In all of these applications, it is advantageous that the energy cured ink or coating contains minimal amounts of uncured material that could leach ("migrate") out of the ink/coating into the surrounding environment, thereby causing unwanted contamination of the packaged product. This is of particular concern for food packaging where any contamination of the packaged food from undesirable, migratable, ink components should be minimized.

Where cleavage type photoinitiators (also known as type I photoinitiators) are used, photodecomposition products are generated during UV-curing. These decomposition products could migrate out of the coating, potentially contaminating the surrounding environment.

Use of high amounts of monofunctional monomers is also a problem in applications that require cured inks and coatings having low migration of contaminants (see U.S. Pat. No. 9,605,180). There are often residual, uncured, monofunctional monomers present after an ink or coating is cured. These residual monomers can migrate, contaminating the product.

CN 102964968, CN 102492330, and U.S. Pat. No. 9,394, 461 all describe dual cure compositions comprising both free radical and cationic photoinitiators, where the cationic photoinitiator is used to initiate a sol-gel reaction. However, these compositions contain high amounts of monofunctional monomers, and would therefore not be suitable for applications requiring low migration of residual ink components.

EP 2302007 describes UV-curable ink compositions comprising significant quantities of monofunctional monomer. Because of the high levels of monofunctional monomers these compositions would be unsuitable for low migration applications. Compositions comprising 2-hydroxy-1-{4-[4-(2-hydroxy-2-methyl-propionyl)-benzyl]phenyl}-2-methyl-propan-1-one (Irgacure 127) are shown. Compositions comprising ketosulphone photoinitiators are described, but not in combination with Irgacure 127.

Similarly, U.S. Pat. No. 8,507,726 describes photoinitiator mixtures comprising Irgacure 127, or Esacure 1001M (a ketosulphone photoinitiator). However, these two photoinitiators are never used in combination. Moreover, the compositions of U.S. Pat. No. 8,507,726 must always include a specific oxime ester photoinitiator, according to the disclosed generic formula.

US 2018/0022949 (WO 2016/129452) discloses UV-curable inkjet compositions requiring photoinitiators having molecular weights greater than 360. The oligomeric hydroxyalkylphenone photo initiator, oligo[2-hydroxy-2-methyl-1-[4-(1-methylvinyl)phenyl]propanone] is incorporated in a number of examples, but not in combination with a ketosulphone photoinitiator.

Similarly, WO 2007/017348 and WO 2007/017298 disclose compositions comprising hydroxyalkylphenone and ketosulphone photoinitiators, but the two types of photoinitiators are never used in combination. Furthermore, the compositions of WO 2007/017348 and WO 2007/017298 must always contain a specific tertiary amine co-initiator, according to disclosed generic formulae.

No prior art compositions included an added acid. The effect of acids on the production of photodecomposition products from cleavage-type (type I) photoinitiators has not been demonstrated, nor even guessed. Moreover, the prior art is generally focused on ways to reduce the amount of residual, unreacted monomers from migrating. None of the prior art has intimated at ways of reducing the amount of cleavage-type photodecomposition products generated during the UV-curing process. Although the issue associated with photoinitiator decomposition products has been recognized in U.S. Pat. No. 9,605,180, secondary processes to reduce the risk of migration have been taken, such as application of an overprint varnish that blocks the migration of the decomposition products.

Therefore, there is still need to develop inks and coatings that exhibit a reduced risk of migration, without adding an extra step in the print process. Such a need can be fulfilled by developing inks and coatings wherein the amount of photoinitiator decomposition products is reduced, mitigating the need to block them.

BRIEF SUMMARY OF THE INVENTION

The present invention provides UV-curable ink and coating compositions comprising cleavage-type (type I) photoinitiators, that have reduced amounts of photodecomposition products, such as aldehydes and ketones, produced by the cleavage-type photoinitiators during curing of the ink and coating compositions. It has surprisingly been found that including an acid in the ink and coating compositions can effectively reduce the amount of aldehyde and ketone photodecomposition products.

In a particular aspect, the present invention provides UV-curable ink or coating compositions, comprising:
a) one or more photopolymerizable monomers and/or oligomers;
b) one or more cleavage type photoinitiators; and
c) one or more acids.

In certain embodiments, the compositions of the invention comprise at least one organic acid.

In other embodiments, the acid in the compositions is derived from one or more photoacid generators.

In another aspect, the present invention provides a method for preparing a printed substrate having a reduced amount of extractable materials, comprising applying one or more ink or coating compositions of the invention to the substrate, and curing the ink or coating compositions under the actions of UV radiation.

In certain embodiments, the amount of aldehyde extractable materials from a substrate printed or coated with a composition of the present invention is reduced by equal to or greater than 10%, when compared to a substrate printed with a similar ink or coating containing a cleavage type photoinitiator but no acid In yet other embodiments, the present invention provides printed substrates and articles comprising the ink and coating compositions of the invention.

Further advantages and aspects of the present invention are described more fully below.

DETAILED DESCRIPTION OF THE INVENTION

It is to be understood that the foregoing general description and the following detailed description are exemplary and explanatory only, and are not restrictive of any subject matter claimed.

Unless otherwise defined, all technical and scientific terms used herein have the same meaning as is commonly understood by one of skill in the art to which the inventions belong. All patents, patent applications, published applications and publications, websites and other published materials referred to throughout the entire disclosure herein, unless noted otherwise, are incorporated by reference in their entirety for any purpose.

The inventors have surprisingly found that the amount of photodecomposition products produced by cleavage-type (type I) photoinitiators can be reduced dramatically by the introduction of an acid into the UV-curable compositions. For example, the decomposition products generated by α-hydroxyalkylphenone photoinitiators during UV-cure can be significantly reduced.

The acid can be introduced into the composition by adding acids, preferably organically modified acids. The acid can also be produced in-situ by incorporating photoacid generators, such as cationic photoinitiators, or ketosulphone photoinitiators, into the compositions. Either of these approaches, depending on the nature of the acid, can have a significant impact on the amount of photodecomposition products produced by cleavage-type photoinitiators during UV-irradiation in the photoinitiation stage of UV-curing. This finding is especially useful in applications where low migration from a UV-cured composition is required. Examples of such applications are printing of food packaging, pharmaceutical packaging, toys, etc. In the case of α-hydroxyalkylphenone photoinitiators (also commonly referred to as α-hydroxyketone and hydroxyacetophenone photoinitiators), a number of types suitable for low migration applications are available, such as Irgacure 127, Irgacure 2959, Esacure KIP160, Esacure One, Esacure 150, etc. Although these photoinitiators themselves have recognized low migration potential, their decomposition products after UV irradiation can migrate at unacceptable levels. Therefore, the current invention has great benefit as it further enables the use of these types of photoinitiators in sensitive printing and coating applications where low migration is required.

In a particular aspect, the present invention provides UV-curable ink or coating compositions, comprising:
a) one or more photopolymerizable monomers and/or oligomers;
b) one or more cleavage type photoinitiators; and
c) one or more acids.

Definitions

In this application, the use of the singular includes the plural unless specifically stated otherwise. As used herein, the singular forms "a," "an" and "the" are intended to include the plural forms as well, unless the context clearly indicates otherwise.

In this application, the use of "or" means "and/or" unless stated otherwise.

As used herein, the terms "comprises" and/or "comprising" specify the presence of the stated features, integers, steps, operations, elements, and/or components, but do not preclude the presence or addition of one or more other features, integers, steps, operations, elements, components, and/or groups thereof. Furthermore, to the extent that the terms "includes," "having," "has," "with," "composed," "comprised" or variants thereof are used in either the detailed description or the claims, such terms are intended to be inclusive in a manner similar to the term "comprising."

As used herein, ranges and amounts can be expressed as "about" a particular value or range. "About" is intended to also include the exact amount. Hence "about 5 percent" means "about 5 percent" and also "5 percent." "About" means within typical experimental error for the application or purpose intended.

As used herein, the terms "(meth)acrylate" or "(meth) acrylic acid" include both acrylate and methacrylate compounds, and both acrylic acid and methacrylic acid.

As used herein, "monofunctional" means having one functional group.

As used herein, "multifunctional" means having two or more functional groups. A multifunctional monomer, for e.g., can be a di-functional, tri-functional, tetra-functional or have a higher number of functional groups. The two or more functional groups can be the same or different.

As used herein, the terms "monomer," "monomers," and "monomers and/or oligomers" are intended to include both monomers and oligomers, or mixtures thereof.

As used herein, a "photo-acid generator" or "PAG" is any compound that can be converted into a strong acid by photolysis. In the case of cationic photoinitiators and ketosulphone photoinitiators, which are preferred PAGs used in the present invention, this is achieved by a photodissociation process.

As used herein, a "sulphonic" acid is an acid comprising an $S(=O)_2$—OH group.

As used herein, a "phosphoric" acid is an acid comprising an $O=P-(OH)_3$ group.

As used herein, a "phosphonic" acid is an acid comprising an $O=PH-(OH)_2$ group.

As used herein, the term "alkyl" refers to straight chain and branched saturated non-cyclic hydrocarbons, having from 1 to 22 carbon atoms. Representative straight chain alkyl groups include methyl, -ethyl, -n-propyl, -n-butyl, -n-pentyl, -n-hexyl, n-heptyl, n-octyl, n-nonyl, n-decyl, and n-amyl. Representative branched alkyl groups include isopropyl, sec-butyl, isobutyl, tert-butyl, isopentyl, neopentyl, 1-methylbutyl, 2-methylbutyl, 3-methylbutyl, 1,1-dimethylpropyl, 1,2-dimethylpropyl, 1-methylpentyl, 2-methylpentyl, 3-methylpentyl, 4-methylpentyl, 1-ethylbutyl, 2-ethylbutyl, 3-ethylbutyl, 1,1-dimethylbutyl, 1,2-dimethylbutyl, 1,3-dimethylbutyl, 2,2-dimethylbutyl, 2,3-dimethylbutyl, 3,3-dimethylbutyl, 5-methylhexyl, 6-methylheptyl, 2-ethylhexyl, and the like.

As used herein, the term "aryl" means an aromatic carbocyclic ring containing 6 to 22 carbon atoms, including both mono-, bi-, and tricyclic ring systems. Representative aryl groups include -indenyl, -phenyl, -naphthyl, anthracenyl and the like.

As used herein, "optionally substituted" refers to a group that is either unsubstituted or substituted. Substitutions include any moiety that is suitable.

As used herein, the terms "inks and coatings," "inks," "compositions," "fluids" and the like are used interchangeably.

As used herein, "energy-curing" refers to the cure achieved under exposure to various electromagnetic radiation sources producing an actinic effect. Such sources include but are not limited to, electron-beam, UV-light, visible-light, IR, or microwave. Where the compositions are cured under the action of UV light, then non-limiting UV sources such as the following can be used: low pressure mercury bulbs, medium pressure mercury bulbs, a xenon bulb, excimer lamps, a carbon arc lamp, a metal halide bulb, a UV-LED lamp or sunlight. It should be appreciated by those skilled in the art that any UV light source, or other source of actinic radiation, may be used to cure compositions prepared according to the current invention.

As used herein, "low migration" refers to the level of contamination of any packaged produce or product being less than 50 parts per billion (ppb) of any particular uncured monomer that may leach out of the ink or coating once it is cured on the substrate. 'Low migration' further means that contamination by photoinitiator residues and decomposition products should also be less than 50 ppb, or less than the specific migration limit (SML) existing for any specific photoinitiator. The methods of the current invention lend themselves to applications where higher conversion of monomer via energy curing, and reduced amounts of photodecomposition products, is preferable. Such applications include the printing of food packaging, pharmaceutical packaging, personal care and household packaging, display boards in supermarkets, etc. In all these applications it is advantageous that the energy-cured ink, or coating, contains minimal amounts of uncured material and photodecomposition products that could leach ('migrate') out of the ink into the surrounding environment thereby causing unwanted contamination. This is of particular concern for food packaging where any contamination of the packaged food from undesirable, migratable, ink components should be minimized. Therefore, any means to increase the conversion of such low molecular weight, low functionality monomers, and decrease the amount of photodecomposition products, during energy curing would be advantageous for the aforementioned sensitive printing applications. This is achieved by the compositions of the present invention, and the methods of printing energy curable ink and coating compositions according to the current invention.

As used herein, the term "article" or "articles" means a substrate or product of manufacture. Examples of articles include, but are not limited to: substrates such as paper, plastic, plastic or polymer film, glass, ceramic, metal, composites, and the like; and products of manufacture such as publications (e.g. brochures), labels, and packaging materials (e.g. cardboard sheet or corrugated board), containers (e.g. bottles, cans), a polyolefin (e.g. polyethylene or polypropylene), a polyester (e.g. polyethylene terephthalate), a metalized foil (e.g. laminated aluminum foil), metalized polyester, a metal container, and the like.

Throughout this disclosure, all parts and percentages are by weight (wt % or mass % based on the total weight) and all temperatures are in ° C. unless otherwise indicated.

Compositions

The present invention covers any cleavage type (type I) photoinitiators, and particularly α-hydroxyalkylphenones, especially those suitable for low migration applications. Acids generated by cationic photoinitiators or other photoacid generators are preferred, but the addition of any organic or inorganic acid to the composition is also covered.

Disclosed are UV-curable compositions, suitable for low migration printing and coating applications, comprising cleavage type (type I) photoinitiators, preferably α-hydroxyalkylphenone photoinitiators. The compositions of the invention comprise acids, where the acid may optionally be generated from a photoacid generator. Where the acid is produced by a photoacid generator, then cationic photoinitiators are a preferred class. Ketosulphone photoinitiators may also be used as the photoacid generator. A further aspect of the invention is that the amount of decomposition products produced by the photoinitiators during the UV-curing process should preferably be reduced by 10% (w/w) or more, more preferably 25% (w/w) or more.

The surprising finding that the incorporation of acids into UV-curing compositions comprising cleavage type photoinitiators, such as α-hydroxyalkylphenone photoinitiators, can reduce the amount of their photodecomposition products being produced has not previously been reported in the literature. Therefore, an aspect of the present invention is not merely compositions comprising the combination of cleavage type, particularly α-hydroxyalkylphenone, photoinitiators with acids, but, perhaps more importantly, the extent by which the amount of aldehyde and/or ketone, particularly aldehyde, produced as a photodecomposition product of these types of photoinitiators is reduced. Thus, the present invention also encompasses that the amount of aldehyde produced by cleavage type photoinitiators would preferably be lowered by at least 10%, more preferably 20% or more, compared to compositions that contain cleavage type photoinitiators, but no acids.

The nature of the acid has an impact on this lowering of the amount of aldehydes produced as a photodecomposition by-product of photoinitiation. Especially preferred acids are inorganic and organic derivatives of phosphoric acid, phosphonic acid, and sulphonic acid, although it should be understood that any inorganic or organic acid able to induce the required lowering of the generation of aldehydes is encompassed by the present invention.

In some embodiments, it is preferred that an acid is not added to a UV-curable composition containing cleavage type photoinitiators. A particularly surprising finding is that the use of cationic photoinitiators to produce "in-situ" UV-generated acids is a particularly effective means of producing the acid that enables the lowering of the aldehyde produced during UV-cure from cleavage type photoinitiators. This has advantages in instances where the presence of acid could have an impact on, for instance, the long-term shelf-life of UV-curable compositions. A feature of many commercial cationic photoinitiators is that under the action of UV-light, they produce very strong inorganic acids, such as hexafluorophosphoric acid. Indeed, the inventors have found that the phosphoric acid and phosphinic acid derivatives, including organic derivatives, are especially effective in lowering the amount of aldehydes produced by cleavage type photoinitiators during UV-cure.

Although not cationic photoinitiators as such, ketosulphone free radical photoinitiators produce sulpho radicals upon exposure to UV radiation, which are acidic in nature, and which may form sulphonic acids. An example of such a photoinitiator is 1-{4-[(4-benzoylphenyl)sulfanyl]phenyl}-2-methyl-[(4-methylphenyl)sulfonyl]propan-1-one (CAS NO:272460-97-6). Other suitable ketosulphone photoinitiators are those described in EP2302007, which are hereby incorporated by reference. Bellotti and colleagues describe how, after beta cleavage, ketosulphone photoinitiators can undergo a disproportionation reaction to produce para-toluene sulphonic acid (E. Bellotti et. al., *Radtech Report*, Issue 1 (2013), p. 13). As well as the parent ketosulpone photoinitiators, the present invention also covers the sulphonic acids that might be formed during the photoinitiation process.

If we consider the photodecomposition of 2-hydroxy-2-methyl-1-phenyl-propan-1-one, a very typical α-hydroxyalkylphenone photoinitiator, although one not suitable for low migration, it is likely that a key migration concern will be with the aldehyde (benzaldehyde) that can be formed during the UV-curing process.

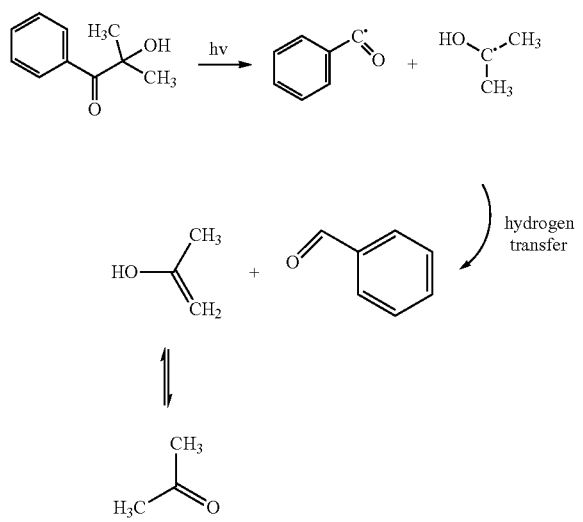

Low migration α-hydroxyalkylphenone photoinitiators encompass the 2-hydroxy-2-methyl-1-phenyl-propan-1-one group as part of their chemical structures as shown below. Representative, but non-limiting, low migration photoinitiators include the following.

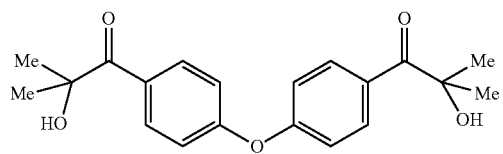

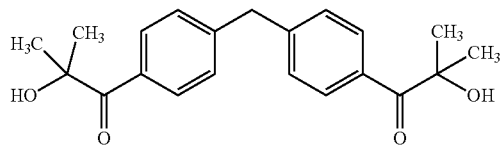

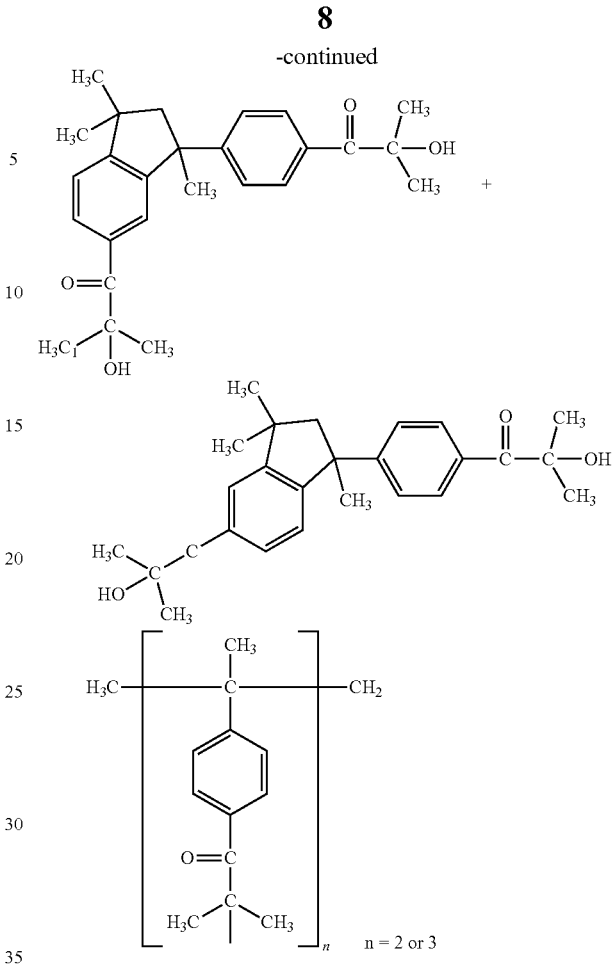

n = 2 or 3

Thus, it is likely that significant photodecomposition products from such low migration photoinitiators will be aldehydes resulting from the aromatic ketone part of the photoinitiator chemical structure. The present invention will mitigate the production of such aldehydes, and other decomposition products, during UV-cure.

Therefore, as should be clear to those skilled in the art, any process which can reduce the amount of photodecomposition products produced from α-hydroxyalkylphenone photoinitiators, and other cleavage type photoinitiators, would be highly desirable for applications requiring the use of these photoinitiators in sensitive printing and coating applications, such as the printing of food packaging. It should be noted that the present invention covers both pigmented and non-pigmented compositions, and is particularly suited to inkjet, flexographic, gravure, and offset printing, although other printing/coating processes are covered by the present invention. Printing processes include, but are not limited to, digital printing, inkjet printing, flexographic printing, offset printing, silk screen printing, lithographic printing, gravure printing, and letter press printing.

Although a number of commercially available α-hydroxyalkylphenone photoinitiators suitable for use in low migration applications are available, the migration risk associated with their decomposition products is not fully understood. Therefore, any process than can minimize the amount of these photodecomposition products being produced would be tremendously advantageous. In the case of difunctional photoinitiators like 2-hydroxy-1-{4-[4-(2-hydroxy-2-methyl-propionyl)-benzyl]-phenyl}-2-methyl-propan-1-one (e.g. Irgacure 127), and 2-hydroxy-1-[4-[4-(2-hydroxy-2-methylpropanoyl)phenoxy]phenyl]-2-methylpropan-1-one (e.g. Esacure KIP160), their decompositions products, including aldehydes, could pose a migration risk and the minimization of that risk is clearly desirable. Although the photoinitiators may have migration limits of 50 ppb, or greater, any photodecomposition product of such photoinitiators would likely be subject to a 10 ppb migration limit (in Europe). The current invention therefore provides a means to help ensure that the risk associated with any photodecomposition product from α-hydroxyalkylphenone or other cleavage type photoinitiators is reduced.

In addition to migration risk, the photodecomposition products from photoinitiators can produce distinct undesirable odor. Thus, again, the current invention provides a means to enhance the use of hydroxyalkylphenone photoinitiators in UV-curing applications where low odor may be desirable.

Reducing the amount of decomposition products produced by cleavage type photoinitiators not only reduces any potential risk associated with the contamination of packaged foods, but, if the amount of the photodecomposition products can be reduced, it could consequently allow the potential use of higher concentrations of the photoinitiator. Even if other cleavage type photoinitiators, such as α-hydroxyketone photoinitiators, are developed for low migration printing/coating applications, then the issue of the resultant decomposition products will remain, and, as such, the current invention provides considerable advantage in the use of such photo initiators.

Advantageously, the amount of aldehyde decomposition products produced by the cleavage type photoinitiator during the UV-curing process should be reduced by 10% (w/w) or more, preferably 20% (w/w) or more, according to the following equation:

$$X = 100 \times ((AD_0 - AD_a)/AD_0) \geq 10.00$$

wherein
  X is the percent reduction of decomposition products;
  $AD_0$ is the amount of decomposition products produced during UV-cure of the composition containing a cleavage type photoinitiator, but without the acid; and
  $AD_a$ is the amount of decomposition products produced during UV-cure of the composition containing a cleavage type photoinitiator and an acid.

The present invention describes the most surprising and significant finding that the amount of photodecomposition products from cleavage type photoinitiators, such as aldehydes and ketones, and especially of aldehydes, can be significantly reduced by the incorporation of acids, notably sulfonic, phosphoric, and phosphonic acids. The impact of inclusion of an acid is shown in the examples, where the data indicate that the generation of aldehydes from cleavage type photoinitiators is reduced by levels of up to about 90%. This advantageous effect, especially for low migration printing and coating applications, has not been previously revealed, nor alluded to, in the prior art.

There is no restriction on the acid, but sulphonic, phosphoric and phosphonic acid derivatives, both inorganic and organic, are preferred. There is no restriction on the minimum concentration of acid or photoacid generator used in the compositions of the present invention other than that sufficient amounts should be used to produce the required reduction in the amount of photoinitiator photodecomposition products during the UV-curing process.

The present invention covers the use of any cleavage type photoinitiators, including α-hydroxyalkylphenones (α-hydroxyketones), acyl phosphine oxides, α-aminoalkylphenones (α-aminoketones), α-dialkoxyacetophenones, benzoin ethers, and benzyl ketals. Preferred are those that are suitable for low migration printing and coating applications, where an issue is the production of photodecomposition products from the photoinitiator, including aldehydes and ketones. Particularly preferred are α-hydroxyalkylphenones. Cleavage type (type I), and especially α-hydroxyalkylphenone, photoinitiators designed for low migration printing and coating applications include monofunctional, multifunctional, polymeric and polymerizable types including, but not limited to: 1-[4-(2-Hydroxyethoxy)-phenyl]-2-hydroxy-2-methyl-1-propane-1-one (Irgacure 2959); 2-Hydroxy-1-{4-[4-(2-hydroxy-2-methyl-propionyl)-benzyl]-phenyl}-2-methyl-propan-1-one; 2-hydroxy-1-[4-(2-acryloxyethoxy)-phenyl]-2-methyl-1-propanone; Oligo[2-hydroxy-2-methyl-1-[4-(1-methylvinyl)phenyl]propanone]; 2-Hydroxy-1-[4-[4-(2-hydroxy-2-methylpropanoyl) phenoxy] phenyl]-2-methylpropan-1-one; low migration acylphosphine oxide photoinitiators, or blends thereof, and includes both mono- and bisacylphosphine oxides. Commercially available products include: bis(2,4,6-trimethylbenzoyl)-phenylphosphineoxide; 2,4,6-trimethylbenzoyl-diphenyl-phosphineoxide; ethyl (2,4,6-trimethylbenzoyl) phenylphosphinate; and bis (2,6-dimethoxybenzoyl)(2,4,4-trimethylpentyl)phosphine oxide.

Suitable α-hydroxyalkylphenones (α-hydroxyketones) include, but are not limited to: 1-hydroxy-cyclohexyl-phenyl-ketone; 2-hydroxy-2-methyl-1-phenyl-1-propanone; 2-hydroxy-2-methyl-4'-tert-butyl-propiophenone; 2-hydroxy-4'-(2-hydroxyethoxy)-2-methyl-propiophenone; 2-hydroxy-4'-(2-hydroxypropoxy)-2-methyl-propiophenone; oligo 2-hydroxy-2-methyl-1-[4-(1-methyl-vinyl)phenyl]propanone; bis[4-(2-hydroxy-2-methylpropionyl)phenyl]methane; 2-hydroxy-1-[1-[4-(2-hydroxy-2-methylpropanoyl)phenyl]-1,3,3-trimethylindan-5-yl]-2-methylpropan-1-one; 2-hydroxy-1-[4-[4-(2-hydroxy-2-methylpropanoyl)phenoxy]phenyl]-2-methylpropan-1-one; combinations thereof; and the like.

Suitable acylphosphine oxide photoinitiators include, but are not limited to: bis(2,4,6-trimethylbenzoyl)-phenylphosphineoxide; bis(2,6-dimethoxybenzoyl)-2,4,4-trimethylpentylphosphinoxide; diphenyl(2,4,6-trimethylbenzoyl)phosphine oxide; ethyl (2,4,6-trimethylbenzoyl) phenylphosphinate; or phosphinic acid, P-(3-benzoyl-2,4,6-trimethylbenzoyl)-P-phenyl-, ethyl ester; combinations thereof; and the like.

Suitable α-aminoalkylphenones (α-aminoketones) include, but are not limited to: 2-methyl-1-[4-methylthio) phenyl]-2-morpholinopropan-1-one; 2-benzyl-2-dimethylamino-1-(4-morpholinophenyl)-butan-1-one; 2-dimethylamino-2-(4-methyl-benzyl)-1-(4-morpholin-4-yl-phenyl)-butan-1-one; combinations thereof; and the like.

Suitable α-dialkoxyacetophenones include, but are not limited to: diethoxy acetophenone; 2,2-dimethoxy-2-phenylacetophenone; combinations thereof; and the like.

Suitable benzoin ethers include, but are not limited to: benzoin ethyl ether; benzoin methyl ether; benzoin isobutyl ether; combinations thereof; and the like.

Suitable benzyl ketals include, but are not limited to: benzyl dimethyl ketal; benzyl methyl-benzyl-monoketal; benzyl methyl-allyl-ketal; benzyl methyl-crotyl-monoketal; combinations thereof; and the like.

Typically, the cleavage type photoinitiators are present in the compositions of the invention in an amount of about 0.1% to about 10% (w/w) based on the total weight of the composition. Preferably, the cleavage type photoinitiators are present in an amount of about 0.5% to about 5%, and most preferably from about 0.5% to about 2.5%. For example, the cleavage type photoinitiators may be present in an amount of about 0.1% to about 9.5%; or about 0.1% to about 9%; or about 0.1% to about 8.5%; or about 0.1% to about 8%; or about 0.1% to about 7.5%; or about 0.1% to about 7%; or about 0.1% to about 6.5%; or about 0.1% to about 6%; or about 0.1% to about 5.5%; or about 0.1% to about 5%; or about 0.1% to about 4.5%; or about 0.1% to about 4%; or about 0.1% to about 3.5%; or about 0.1% to about 3%; or about 0.1% to about 2.5%; or about 0.1% to about 2%; or about 0.1% to about 1.5%; or about 0.1% to about 1%; or about 0.1% to about 0.5%; or about 0.5% to about 10%; or about 0.5% to about 9.5%; or about 0.5% to about 9%; or about 0.5% to about 8.5%; or about 0.5% to about 8%; or about 0.5% to about 7.5%; or about 0.5% to about 7%; or about 0.5% to about 6.5%; or about 0.5% to about 6%; or about 0.5% to about 5.5%; or about 0.5% to about 5%; or about 0.5% to about 4.5%; or about 0.5% to about 4%; or about 0.5% to about 3.5%; or about 0.5% to about 3%; or about 0.5% to about 2.5%; or about 0.5% to about 2%; or about 0.5% to about 1.5%; or about 0.5% to about 1%; or about 1% to about 10%; or about 1% to about 9.5%; or about 1% to about 9%; or about 1% to about 8%; or about 1% to about 7.5%; or about 1% to about 7%; or about 1% to about 6.5%; or about 1% to about 6%; or about 1% to about 5.5%; or about 1% to about 5%; or about 1% to about 4.5%; or about 1% to about 4%; or about 1% to about 3.5%; or about 1% to about 3%; or about 1% to about 2.5%; or about 1% to about 2%; or about 1% to about 1.5%; or about 1.5% to about 10%; or about 1.5% to about 9.5%; or about 1.5% to about 9%; or about 1.5% to about 8.5%; or about 1.5% to about 8%; or about 1.5% to about 7.5%; or about 1.5% to about 7%; or about 1.5% to about 6.5%; or about 1.5% to about 6%; or about 1.5% to about 5.5%; or about 1.5% to about 5%; or about 1.5% to about 4.5%; or about 1.5% to about 4%; or about 1.5% to about 3.5%; or about 1.5% to about 3%; or about 1.5% to about 2.5%; or about 1.5% to about 2%; or about 2% to about 10%; or about 2% to about 9.5%; or about 2% to about 9%; or about 2% to about 8.5%; or about 2% to about 8%; or about 2% to about 7.5%; or about 2% to about 7%; or about 2% to about 6.5%; or about 2% to about 6%; or about 2% to about 5.5%; or about 2% to about 5%; or about 2% to about 4.5%; or about 2% to about 4%; or about 2% to about 3.5%; or about 2% to about 3%; or about 2% to about 2.5%; or about 2.5% to about 10%; or about 2.5% to about 9.5%; or about 2.5% to about 9%; or about 2.5% to about 8.5%; or about 2.5% to about 8%; or about 2.5% to about 7.5%; or about 2.5% to about 7%; or about 2.5% to about 6.5%; or about 2.5% to about 6%; or about 2.5% to about 5.5%; or about 2.5% to about 5%; or about 2.5% to about 4.5%; or about 2.5% to about 4%; or about 2.5% to about 3.5%; or about 2.5% to about 3%; or about 3% to about 10%; or about 3% to about 9.5%; or about 3% to about 9%; or about 3% to about 8.5%; or about 3% to about 8%; or about 3% to about 7.5%; or about 3% to about 7%; or about 3% to about 6.5%; or about 3% to about 6%; or about 3% to about 5.5%; or about 3% to about 5%; or about 3% to about 4.5%; or about 3% to about 4%; or about 3% to about 3.5%; or about 3.5% to about 10%; or about 3.5% to about 9.5%; or about 3.5% to about 9%; or about 3.5% to about 8.5% or about 3.5% to about 8%; or about 3.5% to about 7.5%; or about 3.5% to about 7%; or about 3.5% to about 6.5%; or about 3.5% to about 6%; or about 3.5% to about 5.5%; or about 3.5% to about 5%; or about 3.5% to about 4.5%; or about 3.5% to about 4%; or about 4% to about 10%; or about 4% to about 9.5%; or about 4% to about 9%; or about 4% to about 8.5%; or about 4% to about 8%; or about 4% to about 7.5%; or about 4% to about 7%; or about 4% to about 6.5%; or about 4% to about 6%; or about 4% to about 5.5%; or about 4% to about 5%; or about 4% to about 4.5%; or about 4.5% to about 10%; or about 4.5% to about 9.5%; or about 4.5% to about 9%; or about 4.5% to about 8.5%; or about 4.5% to about 8%; or about 4.5% to about 7.5%; or about 4.5% to about 7%; or about 4.5% to about 6.5%; or about 4.5% to about 6%; or about 4.5% to about 5.5%; or about 4.5% to about 5%; or about 5% to about 10%; or about 5% to about 9.5%; or about 5% to about 9%; or about 5% to about 8.5%; or about 5% to about 8%; or about 5% to about 7.5%; or about 5% to about 7%; or about 5% to about 6%; or about 5% to about 5.5%; or about 5.5% to about 10%; or about 5.5% to about 9.5% or about 5.5% to about 9%; or about 5.5% to about 8.5%; or about 5.5% to about 8%; or about 5.5% to about 7.5%; or about 5.5% to about 7%; or about 5.5% to about 6.5%; or about 5.5% to about 6%; or about 6% to about 10%; or about 6% to about 9.5%; or about 6% to about 9%; or about 6% to about 8.5% or about 6% to about 8%; or about 6% to about 7.5%; or about 6% to about 7%; or about 6% to about 6.5%; or about 6.5% to about 10%; or about 6.5% to about 9.5%; or about 6.5% to about 9%; or about 6.5% to about 8.5%; or about 6.5% to about 8%; or about 6.5% to about 7.5%; or about 6.5% to about 7%; or about 7% to about 10%; or about 7% to about 9.5%; or about 7% to about 9%; or about 7% to about 8.5%; or about 7% to about 8%; or about 7% to about 7.5%; or about 7.5% to about 10%; or about 7.5% to about 9.5%; or about 7.5% to about 9%; or about 7.5% to about 8.5%; or about 7.5% to about 8%; or about 8% to about 10%; or about 8% to about 9.5%; or about 8% to about 9%; or about 8% to about 8.5%; or about 8.5% to about 10%; or about 8.5% to about 9.5%; or about 8.5% to about 9%; or about 9% to about 10%; or about 9% to about 9.5%; or about 9.5% to about 10%.

There is no restriction on the nature of the acid or photoacid generator, or blends thereof, used in the present invention, other than they should induce a 10%, or more, lowering in the amount of aldehyde and/or ketones, particularly aldehyde, photodecomposition products produced by the cleavage type photoinitiators during UV cure. Preferably, the acid or photoacid generator induce a reduction of 20% or more, and most preferably, 50% or more, of the aldehyde photodecomposition products produced by the cleavage type photoinitiators during UV cure. Although weak acids, such as carboxylic acids, can be used, the inventors have found that stronger acids, such as sulphonic, phosphoric, and phosphonic acids, are especially effective in their capacity to cause this reduction in aldehyde production from cleavage type photoinitiators. The present invention encompasses both inorganic and organic acid, although in the case where acids, rather than photoacids, are used, it is preferred that an organic acid be used. Again, where organic acids are used, there is no restriction on the nature of the acid, other than that the organic acid be compatible with the ink or coating composition, and is able to induce the 10% or more reduction in the amount of photodecomposition products produced by the cleavage type photoinitiators during the UV-curing process.

Where a photoacid generator (PAG) is used to generate the acid in-situ during the UV-curing process, preferred types include cationic and ketosulphone photoinitiators. Where ketosulphone photoinitiators are used, a preferred type is 1-{4-[(4-benzoylphenyl)sulfanyl]phenyl}-2-methyl-2-[(4-methylphenyl)sulfonyl]propan-1-one. However, any ketosulphone photoinitiator can be used, and those disclosed in WO 2000/031030 are incorporated herein into the present invention.

Where a cationic photoinitator is used to generate the acid in situ during the UV-curing process, those producing sulphonic, phosphoric, phosphonic, antimonic, and nitric derivatives may be used. Both sulfonium salt (including triarylsulfonium hexafluorophosphate) and iodonium salt cationic photoinitators are covered by the present invention. Suitable cationic photoinitators include, but are not limited to: triphenylsulfonium hexafluorophosphate; 4,4'-dimethyldiphenyl iodonium hexafluorophosphate; 10-biphenyl-4-yl-2-isopropyl-9-oxo-9H-thioxanthen-10-ium hexafluorosphosphate; bis(dodecylphenyl)-iodoniumhexafluoroantimonate; bis-(4-methyl-phenyl)-iodoniumhexafluorophosphate; bis-(($C_{10}$-$C_{14}$)-alkylphenyl) iodoniumhexafluoro-antimonite; bis-(4,4-dodecylphenyl)-iodoniumhexafluorophosphate; bis(4-tert-butylphenyl) iodonium perfluoro-1-butanesulfonate; bis(4-tert-butylphenyl)iodonium p-toluenesulfonate; bis(4-tert-butylphenyl)iodonium triflate; boc-methoxyphenyldiphenyldulfonium triflate; (4-tert-butylphenyl)diphenylsulfonium triflate; diphenyliodonium hexafluorophosphate; diphenyliodonium perfluoro-1-butanesulfonate; diphenyliodonium p-toluenesulfonate; diphenyliodonium nitrate; (4-iodophenyl)diphenylsulfonium triflate; (4-methylphenyl)diphenylsulfonium triflate; triarylsulfonium hexafluoroantimonate salts; triphenylsulfonium triflate; combinations thereof; and the like.

When a PAG is used, there is no lower limit on the amount, other than it is sufficient to produce a reduction of 10% or more in the production of photodecomposition products of cleavage type photoinitiators during the UV-curing process. Typically, PAGs are present in the compositions of the invention in an amount of about 0.1% to about 10.0% (w/w), based on the total weight of the composition. Preferably, PAGs are present in an amount of about 0.25% to about 5.0% (w/w), and most preferably between about 0.5% and about 2.5% (w/w), based on the total weight of the composition. For example, PAGs may be present in an amount of about 0.1% to about 9.5%; or about 0.1% to about 9%; or about 0.1% to about 8.5%; or about 0.1% to about 8%; or about 0.1% to about 7.5%; or about 0.1% to about 7%; or about 0.1% to about 6.5%; or about 0.1% to about 6%; or about 0.1% to about 5.5%; or about 0.1% to about 5%; or about 0.1% to about 4.5%; or about 0.1% to about 4%; or about 0.1% to about 3.5%; or about 0.1% to about 3%; or about 0.1% to about 2.5%; or about 0.1% to about 2%; or about 0.1% to about 1.5%; or about 0.1% to about 1%; or about 0.1% to about 0.5%; or about 0.5% to about 10%; or about 0.5% to about 9.5%; or about 0.5% to about 9%; or about 0.5% to about 8.5%; or about 0.5% to about 8%; or about 0.5% to about 7.5%; or about 0.5% to about 7%; or about 0.5% to about 6.5%; or about 0.5% to about 6%; or about 0.5% to about 5.5%; or about 0.5% to about 5%; or about 0.5% to about 4.5%; or about 0.5% to about 4%; or about 0.5% to about 3.5%; or about 0.5% to about 3%; or about 0.5% to about 2.5%; or about 0.5% to about 2%; or about 0.5% to about 1.5%; or about 0.5% to about 1%; or about 1% to about 10%; or about 1% to about 9.5%; or about 1% to about 9%; or about 1% to about 8%; or about 1% to about 7.5%; or about 1% to about 7%; or about 1% to about 6.5%; or about 1% to about 6%; or about 1% to about 5.5%; or about 1% to about 5%; or about 1% to about 4.5%; or about 1% to about 4%; or about 1% to about 3.5%; or about 1% to about 3%; or about 1% to about 2.5%; or about 1% to about 2%; or about 1% to about 1.5%; or about 1.5% to about 10%; or about 1.5% to about 9.5%; or about 1.5% to about 9%; or about 1.5% to about 8.5%; or about 1.5% to about 8%; or about 1.5% to about 7.5%; or about 1.5% to about 7%; or about 1.5% to about 6.5%; or about 1.5% to about 6%; or about 1.5% to about 5.5%; or about 1.5% to about 5%; or about 1.5% to about 4.5%; or about 1.5% to about 4%; or about 1.5% to about 3.5%; or about 1.5% to about 3%; or about 1.5% to about 2.5%; or about 1.5% to about 2%; or about 2% to about 10%; or about 2% to about 9.5%; or about 2% to about 9%; or about 2% to about 8.5%; or about 2% to about 8%; or about 2% to about 7.5%; or about 2% to about 7%; or about 2% to about 6.5%; or about 2% to about 6%; or about 2% to about 5.5%; or about 2% to about 5%; or about 2% to about 4.5%; or about 2% to about 4%; or about 2% to about 3.5%; or about 2% to about 3%; or about 2% to about 2.5%; or about 2.5% to about 10%; or about 2.5% to about 9.5%; or about 2.5% to about 9%; or about 2.5% to about 8.5%; or about 2.5% to about 8%; or about 2.5% to about 7.5%; or about 2.5% to about 7%; or about 2.5% to about 6.5%; or about 2.5% to about 6%; or about 2.5% to about 5.5%; or about 2.5% to about 5%; or about 2.5% to about 4.5%; or about 2.5% to about 4%; or about 2.5% to about 3.5%; or about 2.5% to about 3%; or about 3% to about 10%; or about 3% to about 9.5%; or about 3% to about 9%; or about 3% to about 8.5%; or about 3% to about 8%; or about 3% to about 7.5%; or about 3% to about 7%; or about 3% to about 6.5%; or about 3% to about 6%; or about 3% to about 5.5%; or about 3% to about 5%; or about 3% to about 4.5%; or about 3% to about 4%; or about 3% to about 3.5%; or about 3.5% to about 10%; or about 3.5% to about 9.5%; or about 3.5% to about 9%; or about 3.5% to about 8.5% or about 3.5% to about 8%; or about 3.5% to about 7.5%; or about 3.5% to about 7%; or about 3.5% to about 6.5%; or about 3.5% to about 6%; or about 3.5% to about 5.5%; or about 3.5% to about 5%; or about 3.5% to about 4.5%; or about 3.5% to about 4%; or about 4% to about 10%; or about 4% to about 9.5%; or about 4% to about 9%; or about 4% to about 8.5%; or about 4% to about 8%; or about 4% to about 7.5%; or about 4% to about 7%; or about 4% to about 6.5%; or about 4% to about 6%; or about 4% to about 5.5%; or about 4% to about 5%; or about 4% to about 4.5%; or about 4.5% to about 10%; or about 4.5% to about 9.5%; or about 4.5% to about 9%; or about 4.5% to about 8.5%; or about 4.5% to about 8%; or about 4.5% to about 7.5%; or about 4.5% to about 7%; or about 4.5% to about 6.5%; or about 4.5% to about 6%; or about 4.5% to about 5.5%; or about 4.5% to about 5%; or about 5% to about 10%; or about 5% to about 9.5%; or about 5% to about 9%; or about 5% to about 8.5%; or about 5% to about 8%; or about 5% to about 7.5%; or about 5% to about 7%; or about 5% to about 6%; or about 5% to about 5.5%; or about 5.5% to about 10%; or about 5.5% to about 9.5% or about 5.5% to about 9%; or about 5.5% to about 8.5%; or about 5.5% to about 8%; or about 5.5% to about 7.5%; or about 5.5% to about 7%; or about 5.5% to about 6.5%; or about 5.5% to about 6%; or about 6% to about 10%; or about 6% to about 9.5%; or about 6% to about 9%; or about 6% to about 8.5% or about 6% to about 8%; or about 6% to about 7.5%; or about 6% to about 7%; or about 6% to about 6.5%; or about 6.5% to about 10%; or about 6.5% to about 9.5%; or about 6.5% to about 9%; or about 6.5% to about 8.5%; or about 6.5% to about 8%; or about 6.5% to about 7.5%; or about 6.5% to about 7%; or about 7% to about 10%; or about 7% to about 9.5%; or about 7% to about 9%; or about 7% to about 8.5%; or about 7% to about 8%; or about 7% to about 7.5%; or about 7.5% to about 10%; or about 7.5% to about 9.5%; or about 7.5% to about 9%; or about 7.5% to about 8.5%; or about 7.5% to about 8%; or about 8% to about 10%; or about 8% to about 9.5%; or about 8% to about 9%; or about 8% to about 8.5%; or about 8.5% to about 10%; or about 8.5% to about 9.5%; or about 8.5% to about 9%; or about 9% to about 10%; or about 9% to about 9.5%; or about 9.5% to about 10%.

When acids are included in the compositions of the present invention, any acid may be used as long as it produces a 10% or greater reduction in the amount of decomposition product produced by the cleavage type photoinitiators during UV-curing. The acid may be monofunctional or polyfunctional with respect to the number of acid groups per molecule. To improve the compatibility of the acid with the rest of the components in the compositions of the present invention, it is preferred that the acid be organically modified. Organic carboxylic acids can be used, but the inventors have found that organically modified sulphonic and phosphoric acids are more effective.

Suitable sulphonic acids include those according to the following formula:

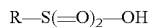

R—S(=O)$_2$—OH where R may be H, an alkyl or aryl group. When R is an alkyl or aryl group, these may be optionally substituted. Suitable sulphonic acids include, but are not limited to: benzenesulphonic acid; p-toluenesulphonic acid; sulfosalicylic acid; triflic acid; camphorsulphonic acid; taurine; sulfoacetic acid; ethanesulfonic acid; 1-propanesulfonic acid; 3-hydroxypropane-1-sulfonic acid; 1,3-propanedisulfonic acid; 3-amino-1-propanesulfonic acid; 4-bromobenzenesulfonic acid; hydroquinonesulfonic acid; sulfanilic acid; 4-ethylbenzenesulfonic acid; dodecylbenzenesulfonic acid; combinations thereof; and the like. Polymerizable and polymeric sulphonic acid derivatives may also be used, and suitable examples of these include, but are not limited to: nafion (perfluoro(2-(2-sulfonylethoxy)propyl vinyl ether)-tetrafluoroethylene copolymer); 2-acrylamido-2-methyl-1-propanesulfonic acid (AMPS); 2-propene-1-sulfonic acid; 2-sulfoethyl methacrylate; 3-sulfopropyl methacrylate; combinations thereof; and the like. Also encompassed by the present invention is the use of any sulphonic acid, which is part, or fully, neutralized with a base.

Suitable phosphoric acids include those according to the following formula:

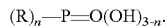

(R)$_n$—P=O(OH)$_{3-n}$.

where R may be H, an alkyl or aryl group; and n is an integer from 1 to 2. When R is an alkyl or aryl group, this may be optionally substituted. Suitable phosphoric acids include, but are not limited to: phosphoric acid; phosphonic acid; phosphoric acid-2-hydroxyethyl methacrylate; binol phosphoric acid and substituted binol-phosphoric acids; bis(2-methacryloxyethyl)phosphate; vinylphosphoric acid; ethyl acid phosphate; butyl acid phosphate; combinations thereof; and the like.

Any carboxylic acid may be used in the compositions of the present invention, and these acids may be mono- or poly-functional with respect to the acid groups, and polymeric and polymerizable types are hereby included. Suitable carboxylic acids include, but are not limited to: acetic acid; propionic acid; butyric acid; caproic acid; oxalic acid; malic acid; lactic acid; citric acid; acrylic acid; maleic acid; fumaric acid; 3-butene-1,2,3-tricarboxylic acid; β-carboxyethyl acrylate; methacrylic acid; 4-vinylbenzoic acid; angelic acid; cytronellic acid; ricin acid; oleic acid; palmitooleic acid; erucic acid; sorbic acid; linolenic acid; itaconic acid; combinations thereof; and the like. Homo- and co-polymers of acrylic acid or methacrylic acid may be used, as may any homo- or co-polymer of any ethylenically unsaturated carboxylic acid. Styrene-maleic anhydride copolymers may be used as well as the half-esters thereof, including the half-esters produced by reaction of the styrene-maleic acid copolymer with hydroxyl-functional (meth)acrylate monomers, such as the Sarbox range of oligomers available from Arkema. Other polymerizable carboxylic acids that may be used in the present invention include carboxylic acid functional epoxy acrylate resins. These resins can be produced by the reaction of a polyepoxide resin with an ethylenically unsaturated carboxylic acid, such as acrylic acid, to produce an intermediate hydroxyl-functional ethylenically unsaturated resin. This intermediate resin is then further reacted with polyfunctional carboxylic acids or anhydrides, such as terephthalic anhydride, to produce the final carboxylic acid-functional photocurable resin.

There is no lower or upper limit on the amount of acid that is used in the compositions of the present invention, and acids may be combined with PAGs to produce the desired effect. Typically, the concentration of any acid or blend of acids is between about 0.1% and 20% (w/w), based on the total weight of the composition. Preferably, the concentration of any acid or blend of acids is from about 0.5% to about 10% (w/w), and most preferably about 0.5% to about 5% (w/w), based on the total weight of the composition. The acid or blend of acids may be present in a concentration of about 0.1% to about 15%; or about 0.1% to about 10%. For example, the acid or blend of acids may be present in an amount of about 0.1% to about 9.5%; or about 0.1% to about 9%; or about 0.1% to about 8.5%; or about 0.1% to about 8%; or about 0.1% to about 7.5%; or about 0.1% to about 7%; or about 0.1% to about 6.5%; or about 0.1% to about 6%; or about 0.1% to about 5.5%; or about 0.1% to about 5%; or about 0.1% to about 4.5%; or about 0.1% to about 4%; or about 0.1% to about 3.5%; or about 0.1% to about 3%; or about 0.1% to about 2.5%; or about 0.1% to about 2%; or about 0.1% to about 1.5%; or about 0.1% to about 1%; or about 0.1% to about 0.5%; or about 0.5% to about 10%; or about 0.5% to about 9.5%; or about 0.5% to about 9%; or about 0.5% to about 8.5%; or about 0.5% to about 8%; or about 0.5% to about 7.5%; or about 0.5% to about 7%; or about 0.5% to about 6.5%; or about 0.5% to about 6%; or about 0.5% to about 5.5%; or about 0.5% to about 5%; or about 0.5% to about 4.5%; or about 0.5% to about 4%; or about 0.5% to about 3.5%; or about 0.5% to about 3%; or about 0.5% to about 2.5%; or about 0.5% to about 2%; or about 0.5% to about 1.5%; or about 0.5% to about 1%; or about 1% to about 10%; or about 1% to about 9.5%; or about 1% to about 9%; or about 1% to about 8%; or about 1% to about 7.5%; or about 1% to about 7%; or about 1% to about 6.5%; or about 1% to about 6%; or about 1% to about 5.5%; or about 1% to about 5%; or about 1% to about 4.5%; or about 1% to about 4%; or about 1% to about 3.5%; or about 1% to about 3%; or about 1% to about 2.5%; or about 1% to about 2%; or about 1% to about 1.5%; or about 1.5% to about 10%; or about 1.5% to about 9.5%; or about 1.5% to about 9%; or about 1.5% to about 8.5%; or about 1.5% to about 8%; or about 1.5% to about 7.5%; or about 1.5% to about 7%; or about 1.5% to about 6.5%; or about 1.5% to about 6%; or about 1.5% to about 5.5%; or about 1.5% to about 5%; or about 1.5% to about 4.5%; or about 1.5% to about 4%; or about 1.5% to about 3.5%; or about 1.5% to about 3%; or about 1.5% to about 2.5%; or about 1.5% to about 2%; or about 2% to about 10%; or about 2% to about 9.5%; or about 2% to about 9%; or about 2% to about 8.5%; or about 2% to about 8%; or about 2% to about 7.5%; or about 2% to about 7%; or about 2% to about 6.5%; or about 2% to about 6%; or about 2% to about 5.5%; or about 2% to about 5%; or about 2% to about 4.5%; or about 2% to about 4%; or about 2% to about 3.5%; or about 2% to about 3%; or about 2% to about 2.5%; or about 2.5% to about 10%; or about 2.5% to about 9.5%; or about 2.5% to about 9%; or about 2.5% to about 8.5%; or about 2.5% to about 8%; or about 2.5% to about 7.5%; or about 2.5% to about 7%; or about 2.5% to about 6.5%; or about 2.5% to about 6%; or about 2.5% to about 5.5%; or about 2.5% to about 5%; or about 2.5% to about 4.5%; or about 2.5% to about 4%; or about 2.5% to about 3.5%; or about 2.5% to about 3%; or about 3% to about 10%; or about 3% to about 9.5%; or about 3% to about 9%; or about 3% to about 8.5%; or about 3% to about 8%; or about 3% to about 7.5%; or about 3% to about 7%; or about 3% to about 6.5%; or about 3% to about 6%; or about 3% to about 5.5%; or about 3% to about 5%; or about 3% to about 4.5%; or about 3% to about 4%; or about 3% to about 3.5%; or about 3.5% to about 10%; or about 3.5% to about 9.5%; or about 3.5% to about 9%; or about 3.5% to about 8.5% or about 3.5% to about 8%; or about 3.5% to about 7.5%; or about 3.5% to about 7%; or about 3.5% to about 6.5%; or about 3.5% to about 6%; or about 3.5% to about 5.5%; or about 3.5% to about 5%; or about 3.5% to about 4.5%; or about 3.5% to about 4%; or about 4% to about 10%; or about 4% to about 9.5%; or about 4% to about 9%; or about 4% to about 8.5%; or about 4% to about 8%; or about 4% to about 7.5%; or about 4% to about 7%; or about 4% to about 6.5%; or about 4% to about 6%; or about 4% to about 5.5%; or about 4% to about 5%; or about 4% to about 4.5%; or about 4.5% to about 10%; or about 4.5% to about 9.5%; or about 4.5% to about 9%; or about 4.5% to about 8.5%; or about 4.5% to about 8%; or about 4.5% to about 7.5%; or about 4.5% to about 7%; or about 4.5% to about 6.5%; or about 4.5% to about 6%; or about 4.5% to about 5.5%; or about 4.5% to about 5%; or about 5% to about 10%; or about 5% to about 9.5%; or about 5% to about 9%; or about 5% to about 8.5%; or about 5% to about 8%; or about 5% to about 7.5%; or about 5% to about 7%; or about 5% to about 6%; or about 5% to about 5.5%; or about 5.5% to about 10%; or about 5.5% to about 9.5% or about 5.5% to about 9%; or about 5.5% to about 8.5%; or about 5.5% to about 8%; or about 5.5% to about 7.5%; or about 5.5% to about 7%; or about 5.5% to about 6.5%; or about 5.5% to about 6%; or about 6% to about 10%; or about 6% to about 9.5%; or about 6% to about 9%; or about 6% to about 8.5% or about 6% to about 8%; or about 6% to about 7.5%; or about 6% to about 7%; or about 6% to about 6.5%; or about 6.5% to about 10%; or about 6.5% to about 9.5%; or about 6.5% to about 9%; or about 6.5% to about 8.5%; or about 6.5% to about 8%; or about 6.5% to about 7.5%; or about 6.5% to about 7%; or about 7% to about 10%; or about 7% to about 9.5%; or about 7% to about 9%; or about 7% to about 8.5%; or about 7% to about 8%; or about 7% to about 7.5%; or about 7.5% to about 10%; or about 7.5% to about 9.5%; or about 7.5% to about 9%; or about 7.5% to about 8.5%; or about 7.5% to about 8%; or about 8% to about 10%; or about 8% to about 9.5%; or about 8% to about 9%; or about 8% to about 8.5%; or about 8.5% to about 10%; or about 8.5% to about 9.5%; or about 8.5% to about 9%; or about 9% to about 10%; or about 9% to about 9.5%; or about 9.5% to about 10%.

As well as cleavage type (type I) photoinitiators, there is no restriction on the type, blend, or concentration of other free radical photoinitiators used. Suitable other photoinitiators include, but are not limited to benzophenones, thioxanthones, phenyl glyoxylates, oxime esters, titanocenes, fluorenones, anthraquinones, combinations thereof, and the like.

Suitable thioxanthones include, but are not limited to: 2-4-diethylthioxanthone; isopropylthioxanthone; 2-chlorothioxanthone; 1-chloro-4-propoxythioxanthone; combinations thereof; and the like.

Suitable benzophenones include, but are not limited to: benzophenone; 4-phenylbenzophenone; 4-methylbenzophenone; methyl-2-benzoylbenzoate; 4-benzoyl-4-methyldiphenyl sulphide; 4-hydroxybenzophenone; 2,4,6-trimethyl benzophenone, 4,4-bis(diethylamino)benzophenone; benzophenone-2-carboxy(tetraethoxy)acrylate; 4-hydroxybenzophenone laurate; 1-[–4-[benzoylphenylsulpho]phenyl]-2-methyl-2-(4-methylphenylsulphonyl)propan-1-one; combinations thereof; and the like.

Suitable phenylglyoxylates include, but are not limited to: phenyl glyoxylic acid methyl ester; oxy-phenyl-acetic acid 2-[hydroxyl-ethoxy]-ethyl ester; oxy-phenyl-acetic acid 2-[2-oxo-2-phenyl-acetoxy-ethoxy]-ethyl ester; combinations thereof; and the like.

Suitable oxime esters include, but are not limited to: 1-phenyl-1,2-propanedione-2-(O-ethoxycarbonyl)oxime; [1-(4-phenylsulfanylbenzoyl)heptylideneamino]benzoate; [1-[9-ethyl-6-(2-methylbenzoyl)carbazol-3-yl]-ethylideneamino]acetate; combinations thereof; and the like.

Examples of other suitable photoinitiators include diethoxy acetophenone; benzil; benzil dimethyl ketal; titanocen radical initiators such as titanium-bis(η 5-2,4-cyclopentadien-1-yl)-bis-[2,6-difluoro-3-(1H-pyrrol-1-yl) phenyl]; 9-fluorenone; camphorquinone; 2-ethyl anthraquinone; combinations thereof; and the like.

An amine synergist may also optionally be included in the formulation. Suitable examples include, but are not limited to: aromatic amines, such as 2-(dimethylamino)ethylbenzoate; N-phenyl glycine; benzoic acid, 4-(dimethylamino)-, 1,1'-[(methylimino)di-2,1-ethanediyl] ester; and simple alkyl esters of 4-(N,N-dimethylamino)benzoic acid and other positional isomers of N,N-dimethylamino)benzoic acid esters, with ethyl, amyl, 2-butoxyethyl and 2-ethylhexyl esters being particularly preferred; aliphatic amines, such as such as N-methyldiethanolamine, triethanolamine and tri-isopropanolamine; aminoacrylates and amine modified polyether acrylates, such as EBECRYL 80, EBECRYL 81, EBECRYL 83, EBECRYL 85, EBECRYL 880, EBECRYL LEO 10551, EBECRYL LEO 10552, EBECRYL LEO 10553, EBECRYL 7100, EBECRYL P115 and EBECRYL P116 available from ALLNEX; CN501, CN550, CN UVA421, CN3705, CN3715, CN3755, CN381 and CN386, all available from Sartomer; GENOMER 5142, GENOMER 5161, GENOMER 5271 and GENOMER 5275 from RAHN; PHOTOMER 4771, PHOTOMER 4967, PHOTOMER 5006, PHOTOMER 4775, PHOTOMER 5662, PHOTOMER 5850, PHOTOMER 5930, and PHOTOMER 4250 all available from IGM, LAROMER LR8996, LAROMER LR8869, LAROMER LR8889, LAROMER LR8997, LAROMER PO 83F, LAROMER PO 84F, LAROMER PO 94F, LAROMER PO 9067, LAROMER PO 9103, LAROMER PO 9106 and LAROMER P077F, all available from BASF; AGISYN 701, AGISYN 702, AGISYN 703, NeoRad P-81 and NeoRad P-85 all available from DSM-AGI.

Polymeric photoinitiators and sensitizers are also suitable, including, for example, polymeric aminobenzoates (GENOPOL AB-1 or AB-2 from RAHN; Omnipol ASA from IGM or Speedcure 7040 from Lambson), polymeric benzophenone derivatives (GENOPOL BP-1 or BP-2 from RAHN; Omnipol BP, Omnipol BP2702 or Omnipol 682 from IGM or Speedcure 7005 from Lambson); polymeric thioxanthone derivatives (GENOPOL TX-1 or TX-2 from RAHN, Omnipol TX from IGM or Speedcure 7010 from Lambson); polymeric aminoalkylphenones such as Omnipol 910 from IGM; polymeric benzoyl formate esters such as Omnipol 2712 from IGM; and the polymeric sensitizer Omnipol SZ from IGM.

UV sensitizers may also optionally be included in the compositions of the present invention. Typical sensitizers include thioxanthones, anthracenes, napthalenes, perylenes, and any of the sensitizers described in U.S. Pat. Nos. 6,313,188 and 8,785,515; combinations thereof; and the like. Preferred UV sensitizers are thioxanthones suitable for low migration applications, such as multifunctional, polymeric, or polymerizable thioxanthones.

When present, the UV sensitizer is typically present in an amount of about 0.1% to about 10% (w/w), based on the total weight of the composition. Preferably, the amount of UV sensitizer is about 0.5% to about 5% (w/w). For example, the UV sensitizer may be present in an amount of about 0.1% to about 9.5%; or about 0.1% to about 9%; or about 0.1% to about 8.5%; or about 0.1% to about 8%; or about 0.1% to about 7.5%; or about 0.1% to about 7%; or about 0.1% to about 6.5%; or about 0.1% to about 6%; or about 0.1% to about 5.5%; or about 0.1% to about 5%; or about 0.1% to about 4.5%; or about 0.1% to about 4%; or about 0.1% to about 3.5%; or about 0.1% to about 3%; or about 0.1% to about 2.5%; or about 0.1% to about 2%; or about 0.1% to about 1.5%; or about 0.1% to about 1%; or about 0.1% to about 0.5%; or about 0.5% to about 10%; or about 0.5% to about 9.5%; or about 0.5% to about 9%; or about 0.5% to about 8.5%; or about 0.5% to about 8%; or about 0.5% to about 7.5%; or about 0.5% to about 7%; or about 0.5% to about 6.5%; or about 0.5% to about 6%; or about 0.5% to about 5.5%; or about 0.5% to about 5%; or about 0.5% to about 4.5%; or about 0.5% to about 4%; or about 0.5% to about 3.5%; or about 0.5% to about 3%; or about 0.5% to about 2.5%; or about 0.5% to about 2%; or about 0.5% to about 1.5%; or about 0.5% to about 1%; or about 1% to about 10%; or about 1% to about 9.5%; or about 1% to about 9%; or about 1% to about 8%; or about 1% to about 7.5%; or about 1% to about 7%; or about 1% to about 6.5%; or about 1% to about 6%; or about 1% to about 5.5%; or about 1% to about 5%; or about 1% to about 4.5%; or about 1% to about 4%; or about 1% to about 3.5%; or about 1% to about 3%; or about 1% to about 2.5%; or about 1% to about 2%; or about 1% to about 1.5%; or about 1.5% to about 10%; or about 1.5% to about 9.5%; or about 1.5% to about 9%; or about 1.5% to about 8.5%; or about 1.5% to about 8%; or about 1.5% to about 7.5%; or about 1.5% to about 7%; or about 1.5% to about 6.5%; or about 1.5% to about 6%; or about 1.5% to about 5.5%; or about 1.5% to about 5%; or about 1.5% to about 4.5%; or about 1.5% to about 4%; or about 1.5% to about 3.5%; or about 1.5% to about 3%; or about 1.5% to about 2.5%; or about 1.5% to about 2%; or about 2% to about 10%; or about 2% to about 9.5%; or about 2% to about 9%; or about 2% to about 8.5%; or about 2% to about 8%; or about 2% to about 7.5%; or about 2% to about 7%; or about 2% to about 6.5%; or about 2% to about 6%; or about 2% to about 5.5%; or about 2% to about 5%; or about 2% to about 4.5%; or about 2% to about 4%; or about 2% to about 3.5%; or about 2% to about 3%; or about 2% to about 2.5%; or about 2.5% to about 10%; or about 2.5% to about 9.5%; or about 2.5% to about 9%; or about 2.5% to about 8.5%; or about 2.5% to about 8%; or about 2.5% to about 7.5%; or about 2.5% to about 7%; or about 2.5% to about 6.5%; or about 2.5% to about 6%; or about 2.5% to about 5.5%; or about 2.5% to about 5%; or about 2.5% to about 4.5%; or about 2.5% to about 4%; or about 2.5% to about 3.5%; or about 2.5% to about 3%; or about 3% to about 10%; or about 3% to about 9.5%; or about 3% to about 9%; or about 3% to about 8.5%; or about 3% to about 8%; or about 3% to about 7.5%; or about 3% to about 7%; or about 3% to about 6.5%; or about 3% to about 6%; or about 3% to about 5.5%; or about 3% to about 5%; or about 3% to about 4.5%; or about 3% to about 4%; or about 3% to about 3.5%; or about 3.5% to about 10%; or about 3.5% to about 9.5%; or about 3.5% to about 9%; or about 3.5% to about 8.5% or about 3.5% to about 8%; or about 3.5% to about 7.5%; or about 3.5% to about 7%; or about 3.5% to about 6.5%; or about 3.5% to about 6%; or about 3.5% to about 5.5%; or about 3.5% to about 5%; or about 3.5% to about 4.5%; or about 3.5% to about 4%; or about 4% to about 10%; or about 4% to about 9.5%; or about 4% to about 9%; or about 4% to about 8.5%; or about 4% to about 8%; or about 4% to about 7.5%; or about 4% to about 7%; or about 4% to about 6.5%; or about 4% to about 6%; or about 4% to about 5.5%; or about 4% to about 5%; or about 4% to about 4.5%; or about 4.5% to about 10%; or about 4.5% to about 9.5%; or about 4.5% to about 9%; or about 4.5% to about 8.5%; or about 4.5% to about 8%; or about 4.5% to about 7.5%; or about 4.5% to about 7%; or about 4.5% to about 6.5%; or about 4.5% to about 6%; or about 4.5% to about 5.5%; or about 4.5% to about 5%; or about 5% to about 10%; or about 5% to about 9.5%; or about 5% to about 9%; or about 5% to about 8.5%; or about 5% to about 8%; or about 5% to about 7.5%; or about 5% to about 7%; or about 5% to about 6%; or about 5% to about 5.5%; or about 5.5% to about 10%; or about 5.5% to about 9.5% or about 5.5% to about 9%; or about 5.5% to about 8.5%; or about 5.5% to about 8%; or about 5.5% to about 7.5%; or about 5.5% to about 7%; or about 5.5% to about 6.5%; or about 5.5% to about 6%; or about 6% to about 10%; or about 6% to about 9.5%; or about 6% to about 9%; or about 6% to about 8.5% or about 6% to about 8%; or about 6% to about 7.5%; or about 6% to about 7%; or about 6% to about 6.5%; or about 6.5% to about 10%; or about 6.5% to about 9.5%; or about 6.5% to about 9%; or about 6.5% to about 8.5%; or about 6.5% to about 8%; or about 6.5% to about 7.5%; or about 6.5% to about 7%; or about 7% to about 10%; or about 7% to about 9.5%; or about 7% to about 9%; or about 7% to about 8.5%; or about 7% to about 8%; or about 7% to about 7.5%; or about 7.5% to about 10%; or about 7.5% to about 9.5%; or about 7.5% to about 9%; or about 7.5% to about 8.5%; or about 7.5% to about 8%; or about 8% to about 10%; or about 8% to about 9.5%; or about 8% to about 9%; or about 8% to about 8.5%; or about 8.5% to about 10%; or about 8.5% to about 9.5%; or about 8.5% to about 9%; or about 9% to about 10%; or about 9% to about 9.5%; or about 9.5% to about 10%

Since the compositions of the present invention are intended for use in low migration applications, such as low migration inks and coatings, it is preferred that photoinitiators having low migration potential are used. Therefore, polymeric, polymerizable, and multifunctional types are preferred.

Compositions according to the present invention may comprise any amount of any blend of free radically polymerizable monomers and oligomers.

Examples of suitable monofunctional ethylenically unsaturated monomers include, but are not limited, to the following: isobutyl acrylate; cyclohexyl acrylate; iso-octyl acrylate; n-octyl acrylate; isodecyl acrylate; iso-nonyl acrylate; octyl/decyl acrylate; lauryl acrylate; 2-propyl heptyl acrylate; tridecyl acrylate; hexadecyl acrylate; stearyl acrylate; iso-stearyl acrylate; behenyl acrylate; tetrahydrofurfuryl acrylate; 4-t-butyl cyclohexyl acrylate; 3,3,5-trimethylcyclohexane acrylate; isobornyl acrylate; dicyclopentyl acrylate; dihydrodicyclopentadienyl acrylate; dicyclopentenyloxyethyl acrylate; dicyclopentanyl acrylate; benzyl acrylate; phenoxyethyl acrylate; 2-hydroxy-3-phenoxypropyl acrylate; alkoxylated nonylphenol acrylate; cumyl phenoxyethyl acrylate; cyclic trimethylolpropane formal acrylate; 2-(2-ethoxyethoxy) ethyl acrylate; polyethylene glycol monoacrylate; polypropylene glycol monoacrylate; caprolactone acrylate; ethoxylated methoxy polyethylene glycol acrylate; methoxy triethylene glycol acrylate; tripropyleneglycol monomethyl ether acrylate; diethyleneglycol butyl ether acrylate; alkoxylated tetrahydrofurfuryl acrylate; ethoxylated ethyl hexyl acrylate; alkoxylated phenol acrylate; ethoxylated phenol acrylate; ethoxylated nonyl phenol acrylate; propoxylated nonyl phenol acylate; polyethylene glycol o-phenyl phenyl ether acrylate; ethoxylated p-cumyl phenol acrylate; ethoxylated nonyl phenol acrylate; alkoxylated lauryl acrylate; ethoxylated tristyrylphenol acrylate; N-(acryloyloxyethyl)hexahydrophthalimide; N-butyl-1,2-(acryloyloxy) ethyl carbamate; acryloyl oxyethyl hydrogen succinate; octoxypolyethylene glycol acrylate; octafluoropentyl acrylate; 2-isocyanato ethyl acrylate; acetoacetoxy ethyl acrylate; 2-methoxyethyl acrylate; dimethyl aminoethyl acrylate; 2-carboxyethyl acrylate; 4-hydroxybutyl acrylate; combinations thereof, and the like. As used herein, the term ethoxylated refers to chain extended compounds through the use of ethylene oxide, propoxylated refers to chain extended compounds through the use of propylene oxide, and alkoxylated refers to chain extended compounds using either or both ethylene oxide and propylene oxide. Equivalent methacrylate compounds are also capable of being used, although those skilled in the art will appreciate that methacrylate compounds have lower reactivity than their equivalent acrylate counterparts.

Since compositions prepared according to the present invention are intended for the low migration printing and coating of low migration applications, including the printing and coating of food packaging, then the amount of any monofunctional monomer used should be limited so as to reduce the risk associated with the migration of uncured monomer present in UV-cured ink or coating. Therefore, another aspect of the present invention is that the amount of any individual monofunctional monomer should be 15% (w/w), or less, preferably 10% (w/w) or less, more preferably 5% (w/w) or less, yet more preferably 2.5% (w/w) or less, based on the total weight of the composition, and most preferably the compositions would contain no monofunctional monomers.

Where monomers are used in the preparation of inventive compositions it is preferable that they be multifunctional with respect to their polymerizable groups. Multifunctional monomers, having two or more ethylenically unsaturated groups, such as acrylate, have a greater probability of reacting into the UV-cured ink or coating compared with a monofunctional monomer, thereby reducing the risk of potential contamination arising from uncured monomer.

Examples of suitable multifunctional ethylenically unsaturated monomers include but are not limited to the following: 1,3-butylene glycol diacrylate; 1,4-butanediol diacrylate; neopentyl glycol diacrylate; ethoxylated neopentyl glycol diacrylate; propoxylated neopentyl glycol diacrylate; 2-methyl-1,3-propanediyl ethoxy acrylate; 2-methyl-1,3-propanediol diacrylate; ethoxylated 2-methyl-1,3-propanediol diacrylate; 3-methyl-1,5-pentanediol diacrylate; 2-butyl-2-ethyl-1,3-propanediol diacrylate; 1,6-hexanediol diacrylate; alkoxylated hexanediol diacrylate; ethoxylated hexanediol diacrylate; propoxylated hexanediol diacrylate; 1,9-nonanediol diacrylate; 1,10-decanediol diacrylate; ethoxylated hexanediol diacrylate; alkoxylated hexanediol diacrylate; diethyleneglycol diacrylate; triethylene glycol diacrylate; tetraethylene glycol diacrylate; polyethylene glycol diacrylate; propoxylated ethylene glycol diacrylate; dipropylene glycol diacrylate; tripropyleneglycol diacrylate; polypropylene glycol diacrylate; poly (tetramethylene glycol) diacrylate; cyclohexane dimethanol diacrylate; ethoxylated cyclohexane dimethanol diacrylate; alkoxylated cyclohexane dimethanol diacrylate; polybutadiene diacrylate; hydroxypivalyl hydroxypivalate diacrylate; tricyclodecanedimethanol diacrylate; 1,4-butanediylbis[oxy(2-hydroxy-3,1-propanediyl)]diacrylate; ethoxylated bisphenol A diacrylate; propoxylated bisphenol A diacrylate; propoxylated ethoxylated bisphenol A diacrylate; ethoxylated bisphenol F diacrylate; 2-(2-vinyloxyethoxy)ethyl acrylate; dioxane glycol diacrylate; ethoxylated glycerol triacrylate; glycerol propoxylate triacrylate; pentaerythritol triacrylate; trimethylolpropane triacrylate; caprolactone modified trimethylol propane triacrylate; ethoxylated trimethylolpropane triacrylate; propoxylated trimethylol propane triacrylate; tris (2-hydroxyethyl) isocyanurate triacrylate; ε-caprolactone modified tris(2-hydroxyethyl) isocyanurate triacrylate; melamine acrylate oligomer; pentaerythritol tetraacrylate; ethoxylated pentaerythritol tetraacrylate; di-trimethylolpropane tetra acrylate; dipentaerythritol pentaacrylate; dipentaerythritol hexaacrylate; ethoxylated dipentaerythritol hexaacrylate; combinations thereof, and the like. The term ethoxylated refers to chain extended compounds through the use of ethylene oxide, propoxylated refers to chain extended compounds through the use of propylene oxide, and alkoxylated refers to chain extended compounds using either or both ethylene oxide and propylene oxide. Equivalent methacrylate compounds are also capable of being used, although those skilled in the art will appreciate that methacrylate compounds have lower reactivity than their equivalent acrylate counterparts.

Examples of monomers comprising free-radically polymerizable groups other than acrylate include N-vinyl amides. Suitable additional free-radically polymerizable monomers include, but are not limited to N-vinylcaprolactam (NVC); N-vinyl pyrollidone (NVP); diacetone acrylamide; N-vinyl oxazolidinone; or N-vinyl methoxazolidinone; N-vinyl carbazole; N-acryloxyoxyethylcyclohexanedicarboximide; N-vinyl imidazole; N-vinyl-N-methylacetamide (VIMA); or acryloyl morpholine (ACMO). Vinyl ethers such as 2-(2-vinyloxyethoxy)ethyl(meth)acrylate (VEEA, VEEM); diethylene glycol divinyl ether (DVE2); triethylene glycol divinyl ether (DVE3); ethyl vinyl ether; n-butyl vinyl ether; iso-butyl vinyl ether; tert-butyl vinyl ether; cyclohexyl vinyl ether (CHVE); 2-ethylhexyl vinyl ether (EHVE); dodecyl vinyl ether (DDVE); octadecyl vinyl ether (ODVE); 1-2-butanediol divinyl ether (BDDVE); 1-4,cyclohexanedimethanol divinylether (CHDM-di); hydroxybutyl vinylether (HBVE); 1-4-cyclohexanedimethanolmono vinylether (CHDM-mono); 1,2,4-trivinylcyclohexane (TVCH); vinylphosphonic acid dimethylester (VPA); or vinylphosphonic acid dimethyl ester (VPADME).

As well as, or in place of, free radically-polymerisable monomers, any concentration and type of free-radically polymerizable oligomer, including but not restricted to polyurethane acrylates, polyester acrylates, polyether acrylates and epoxy acrylates may be used.

The ink and coating compositions of the invention typically comprise a total amount of polymerizable monomers and/or oligomers of about 30% (w/w) to about 95% (w/w), based on the total weight of the composition. For example, the total amount of polymerizable monomers and/or oligomers may be about 30% (w/w) to about 90% (w/w), based on the total weight of the composition; or about 30% to about 85%; or about 30% to about 80%; or about 30% to about 75%; or about 30% to about 70%; or about 30% to about 65%; or about 30% to about 60%; or about 30% to about 55%; or about 30% to about 50%; or about 30% to about 45%; or about 30% to about 40%; or about 30% to about 35%; or about 35% to about 95%; or about 35% to about 90%; or about 35% to about 85%; or about 35% to about 80%; or about 35% to about 75%; or about 35% to about 70%; or about 35% to about 65%; or about 35% to about 60%; or about 35% to about 55%; or about 35% to about 50%; or about 35% to about 45%; or about 35% to about 40%; or about 40% to about 95%; or about 40% to about 90%; or about 40% to about 85%; or about 40% to about 80% or about 40% to about 75%; or about 40% to about 70%; or about 40% to about 65%; or about 40% to about 60%; or about 40% to about 55%; or about 40% to about 50%; or about 40% to about 45%; or about 45% to about 95%; or about 45% to about 90%; or about 45% to about 85%; or about 45% to about 80%; or about 45% to about 75%; or about 45% to about 70%; or about 45% to about 65%; or about 45% to about 60%; or about 45% to about 55%; or about 45% to about 50%; or about 50% to about 95%; or about 50% to about 90%; or about 50% to about 85%; or about 50% to about 80%; or about 50% to about 75%; or about 50% to about 70%; or about 50% to about 65%; or about 50% to about 60%; or about 55% to about 95%; or about 55% to about 90%; or about 55% to about 85%; or about 55% to about 80%; or about 55% to about 75%; or about 55% to about 70%; or about 55% to about 65%; or about 55% to about 60%; or about 60% to about 95%; or about 60% to about 90%; or about 60% to about 85%; or about 60% to about 80%; or about 60% to about 75%; or about 60% to about 70%; or about 60% to about 65%; or about 65% to about 95%; or about 65% to about 90%; or about 65% to about 85%; or about 65% to about 80%; or about 65% to about 75%; or about 65% to about 70%; or about 70% to about 95%; or about 70% to about 90%; or about 70% to about 85%; or about 70% to about 80%; or about 70% to about 75%; or about 75% to about 95%; or about 75% to about 90%; or about 75% to about 85%; or about 75% to about 80%; or about 80% to about 95%; or about 80% to about 90%; or about 80% to about 85%; or about 85% to about 95%; or about 85% to about 90%; or about 90% to about 95%.

The ink and coating compositions of the invention typically comprise about 1% (w/w) to about 95% (w/w) of any individual polymerizable monomer or oligomer, based on the total weight of the composition. For example, the amount of any individual polymerizable monomer or oligomer may be about 1% (w/w) to about 90% (w/w), based on the total weight of the composition; or about 1% to about 90%; or about 1% to about 85%; or about 1% to about 80%; or about 1% to about 75%; or about 1% to about 70%; or about 1% to about 65%; or about 1% to about 60%; or about 1% to about 55%; or about 1% to about 50%; or about 1% to about 45%; or about 1% to about 40%; or about 1% to about 35%; or about 1% to about 30%; or about 1% to about 25%; or about 1% to about 20%; or about 1% to about 15%; or about 1% to about 10%; or about 1% to about 5%; or about 5% to about 95%; or about 5% to about 90%; or about 5% to about 85%; or about 5% to about 80%; or about 5% to about 75%; or about 5% to about 70%; or about 5% to about 65%; or about 5% to about 60%; or about 5% to about 55%; or about 5% to about 50%; or about 5% to about 45%; or about 5% to about 40%; or about 5% to about 35%; or about 5% to about 30%; or about 5% to about 25%; or about 5% to about 20%; or about 5% to about 15% or about 5% to about 10%; or about 10% to about 95%; or about 10% to about 90%; or about 10% to about 85%; or about 10% to about 75%; or about 10% to about 70%; or about 10% to about 65%; or about 10% to about 60%; or about 10% to about 55%; or about 10% to about 50%; or about 10% to about 45%; or about 10% to about 40%; or about 10% to about 35%; or about 10% to about 30%; or about 10% to about 25%; or about 10% to about 20%; or about 10% to about 15%; or about 15% to about 95%; or about 15% to about 90%; or about 15% to about 85%; or about 15% to about 80%; or about 15% to about 75%; or about 15% to about 70%; or about 15% to about 65%; or about 15% to about 60%; or about 15% to about 55%; or about 15% to about 50%; or about 15% to about 45%; or about 15% to about 40%; or about 15% to about 35%; or about 15% to about 30%; or about 15% to about 25%; or about 20% to about 95%; or about 20% to about 90%; or about 20% to about 85%; or about 20% to about 80%; or about 20% to about 75%; or about 20% to about 70%; or about 20% to about 65%; or about 20% to about 60%; or about 20% to about 55%; or about 20% to about 50%; or about 20% to about 45%; or about 20% to about 40%; or about 20% to about 35%; or about 20% to about 30%; or about 20% to about 25%; or about 25% to about 95%; or about 25% to about 90%; or about 25% to about 85%; or about 25% to about 80%; or about 25% to about 75%; or about 25% to about 70%; or about 25% to about 65%; or about 25% to about 60%; or about 30% (w/w) to about 90% (w/w), based on the total weight of the composition; or about 30% to about 85%; or about 30% to about 80%; or about 30% to about 75%; or about 30% to about 70%; or about 30% to about 65%; or about 30% to about 60%; or about 30% to about 55%; or about 30% to about 50%; or about 30% to about 45%; or about 30% to about 40%; or about 30% to about 35%; or about 35% to about 95%; or about 35% to about 90%; or about 35% to about 85%; or about 35% to about 80%; or about 35% to about 75%; or about 35% to about 70%; or about 35% to about 65%; or about 35% to about 60%; or about 35% to about 55%; or about 35% to about 50%; or about 35% to about 45%; or about 35% to about 40%; or about 40% to about 95%; or about 40% to about 90%; or about 40% to about 85%; or about 40% to about 80% or about 40% to about 75%; or about 40% to about 70%; or about 40% to about 65%; or about 40% to about 60%; or about 40% to about 55%; or about 40% to about 50%; or about 40% to about 45%; or about 45% to about 95%; or about 45% to about 90%; or about 45% to about 85%; or about 45% to about 80%; or about 45% to about 75%; or about 45% to about 70%; or about 45% to about 65%; or about 45% to about 60%; or about 45% to about 55%; or about 50% to about 95%; or about 50% to about 90%; or about 50% to about 85%; or about 50% to about 80%; or about 50% to about 75%; or about 50% to about 70%; or about 50% to about 65%; or about 50% to about 60%; or about 50% to about 55%; or about 55% to about 95%; or about 55% to about 90%; or about 55% to about 85%; or about 55% to about 80%; or about 55% to about 75%; or about 55% to about 70%; or about 55% to about 65%; or about 55% to about 60%; or about 60% to about 95%; or about 60% to about 90%; or about 60% to about 85%; or about 60% to about 80%; or about 60% to about 75%; or about 60% to about 70%; or about 60% to about 65%; or about 65% to about 95%; or about 65% to about 90%; or about 65% to about 85%; or about 65% to about 80%; or about 65% to about 75%; or about 65% to about 70%; or about 70% to about 95%; or about 70% to about 90%; or about 70% to about 85%; or about 70% to about 80%; or about 70% to about 75%; or about 75% to about 95%; or about 75% to about 90%; or about 75% to about 85%; or about 75% to about 80%; or about 80% to about 95%; or about 80% to about 90%; or about 80% to about 85%; or about 85% to about 95%; or about 85% to about 90%; or about 90% to about 95% about 25% to about 55%; or about 25% to about 50%; or about 25% to about 45%; or about 25% to about 40%; or about 25% to about 35%; or about 25% to about 30%; or about 30% to about 95%; or about 30% (w/w) to about 90% (w/w), based on the total weight of the composition; or about 30% to about 85%; or about 30% to about 80%; or about 30% to about 75%; or about 30% to about 70%; or about 30% to about 65%; or about 30% to about 60%; or about 30% to about 55%; or about 30% to about 50%; or about 30% to about 45%; or about 30% to about 40%; or about 30% to about 35%; or about 35% to about 95%; or about 35% to about 90%; or about 35% to about 85%; or about 35% to about 80%; or about 35% to about 75%; or about 35% to about 70%; or about 35% to about 65%; or about 35% to about 60%; or about 35% to about 55%; or about 35% to about 50%; or about 35% to about 45%; or about 35% to about 40%; or about 40% to about 95%; or about 40% to about 90%; or about 40% to about 85%; or about 40% to about 80% or about 40% to about 75%; or about 40% to about 70%; or about 40% to about 65%; or about 40% to about 60%; or about 40% to about 55%; or about 40% to about 50%; or about 40% to about 45%; or about 45% to about 95%; or about 45% to about 90%; or about 45% to about 85%; or about 45% to about 80%; or about 45% to about 75%; or about 45% to about 70%; or about 45% to about 65%; or about 45% to about 60%; or about 45% to about 55%; or about 45% to about 50%; or about 50% to about 95%; or about 50% to about 90%; or about 50% to about 85%; or about 50% to about 80%; or about 50% to about 75%; or about 50% to about 70%; or about 50% to about 65%; or about 50% to about 60%; or about 50% to about 55%; or about 55% to about 95%; or about 55% to about 90%; or about 55% to about 85%; or about 55% to about 80%; or about 55% to about 75%; or about 55% to about 70%; or about 55% to about 65%; or about 55% to about 60%; or about 60% to about 95%; or about 60% to about 90%; or about 60% to about 85%; or about 60% to about 80%; or about 60% to about 75%; or about 60% to about 70%; or about 60% to about 65%; or about 65% to about 95%; or about 65% to about 90%; or about 65% to about 85%; or about 65% to about 80%; or about 65% to about 75%; or about 65% to about 70%; or about 70% to about 95%; or about 70% to about 90%; or about 70% to about 85%; or about 70% to about 80%; or about 70% to about 75%; or about 75% to about 95%; or about 75% to about 90%; or about 75% to about 85%; or about 75% to about 80%; or about 80% to about 95%; or about 80% to about 90%; or about 80% to about 85%; or about 85% to about 95%; or about 85% to about 90%; or about 90% to about 95%.

Where the compositions of the present invention are used for applications requiring low migration it is preferred that the total concentration of monofunctional monomer is less than 15% (w/w), based on the total weight of the composition, preferably 10% (w/w), more preferably less than 5% (w/w), yet more preferably less than 2.5% (w/w), and most preferably essentially free of any monofunctional monomer.

Advantageously, including acids in the compositions of the invention does not negatively affect the conversion (curing) of monomers during the UV-curing process. This is important because, in addition to reduced amounts of migratable aldehydes and/or ketones (particularly aldehydes), it is also necessary to minimize the amount of migratable monomers in the cured inks and coatings. Monomers that are cured do not migrate. It is the residual uncured monomers that can migrate from a cured ink or coating. Thus, cured inks and coatings of the present invention also have low levels of migratable monomers.

Where the compositions of the present invention require colorants, suitable colorants include, but are not limited to organic or inorganic pigments and dyes. The dyes include but are not limited to azo dyes, anthraquinone dyes, xanthene dyes, azine dyes, combinations thereof and the like. Organic pigments may be one pigment or a combination of pigments, such as for instance Pigment Yellow Numbers 12, 13, 14, 17, 74, 83, 114, 126, 127, 138, 150, 155, 174, 180, 181, 188; Pigment Red Numbers 2, 22, 23, 48:1, 48:2, 52, 52:1, 53, 57:1, 112, 122, 166, 170, 176, 184, 202, 254, 266, 269; Pigment Orange Numbers 5, 16, 34, 36; Pigment Blue Numbers 15, 15:3, 15:4; Pigment Violet Numbers 3, 19, 23, 27; and/or Pigment Green Number 7. Inorganic pigments may be one of the following non-limiting pigments: iron oxides, titanium dioxides, chromium oxides, ferric ammonium ferrocyanides, ferric oxide blacks, Pigment Black Number 7 and/or Pigment White Numbers 6 and 7. Other organic and inorganic pigments and dyes can also be employed, as well as combinations that achieve the colors desired.

The UV-curable compositions of the present invention may also contain other components which enable them to perform in their intended application. These other ink components include, but are not restricted to; stabilizers, wetting aids, slip agents, inert resins, antifoams, fillers, rheological aids, amine synergists, etc.

The compositions of the present invention may also optionally comprise any blend of acrylic polymer or copolymer which is dissolved into it. These polymers are usually prepared by the (thermal) free radical polymerization of blends of monomers including, but not restricted to, styrene, butyl (meth)acrylate, ethyl (meth)acrylate, methyl (meth)acrylate, isobutyl (meth)acrylate. The acrylic polymer preferably has a number average molecular weight of less than 20,000 g/mole and more preferably less than 10,000 g/mole. The molecular weight of such polymers can be measured by those techniques known in the art such as gel permeation chromatography. Examples of acrylic polymers include those supplied from Dianal, Elvacite Rohm and Haas and DSM, amongst others. The acrylic polymer is preferably present in the compositions at a concentration of between 2 and 20% (w/w), based on the total weight of the composition.

Compositions of the present invention are preferably essentially free of any solvent. However, if required, compositions of the present invention can be diluted with solvents. Both organic and aqueous solvents may be used to dilute the curable compositions of the present invention. The preferred maximum amount of any solvent that could be included in an ink composition is 10% (w/w), based on the total weight of the composition.

The compositions prepared according to the present invention are particularly suited to the preparation of inkjet and flexographic printing inks and coatings. However, the compositions of the invention are also suitable for other types of printing, including, but not limited to, digital, offset, silk screen, lithographic, gravure, or letter press printing applications.

Low migration energy-curable compositions according to the present invention are preferably cured under the action of UV light. For low migration UV-curable compositions, it is preferred that photoinitiators having low migration potential are used. Any combination and concentration of low migration potential photoinitiators may be used and types include, but are not restricted to; polymeric, polymerisable, difunctional, multifunctional photoinitiators. Both type I and type II photoinitiators within those classes are suitable. Suitable polymeric photoinitiators have previously been described. Other photoinitiators suitable for low migration applications include, but are not limited to: 1-[4-(2-Hydroxyethoxy)-phenyl]-2-hydroxy-2-methyl-1-propane-1-one; oligo-[2-hydroxy-2-methyl-1-((4-(1-methylvinyl)phenyl) propanone]; poly(oxy-1,2-ethanediyl)-alpha-(4-(dimethylamino)benzoyl)-omega-((4-(dimethylamino) benzoyl)oxy)-(9CI); 2-hydroxy-1-{4-[4-(2-hydroxy-2-methyl-propionyl)-benzyl]-phenyl}-2-methyl-propan-1-one; 2-hydroxy-1-[4-(4-(2-hydroxy-2-methylpropionyl) phenoxy)phenyl]-2-methyl propan-1-one; combinations thereof; and the like. Photoinitiators which are suitable for low migration may include any of those listed in EUPIA's 'Suitability List of Photo-initiators for Low Migration UV Printing Inks and Varnishes', especially those in Group 1A and 1B.

Any UV light source such as the following can be used: high-pressure mercury bulb, a medium-pressure mercury bulb, a xenon bulb, a carbon arc lamp, a metal halide bulb, a UV-LED lamp or sunlight, can be used. It should be appreciated by those skilled in the art that any UV light source may be used to cure compositions prepared according to the present invention.

Where UV-cured compositions are applied to the (non-contact) surface of primary or secondary packaging intended for foodstuffs, then any contamination from the package impacting the foodstuff should preferably fall within the guidelines set out by Article 3 of Regulation (EC) No. 1935/2004 (and also EC No. 10/2011), as recommended by EUPIA (European Printing Ink Association), requiring that materials and articles in contact with food "shall be manufactured in accordance with the good manufacturing practices, so that under normal or foreseeable conditions of use, they do not transfer their constituents to food in quantities which could endanger human health, bring about an unacceptable change in the composition of the food, or bring about a deterioration in the organoleptic characteristics thereof."

EUPIA has recommended that Article 3 of this provision be followed when producing printed matter for food packaging and has produced a detailed guideline for the selection of raw materials intended for printing inks for food packaging, along with guidelines on the testing of printed matter to ensure that regulatory requirements are achieved. Where no specific migration limit (SML) exists for a specific component then the following migration limits apply: 10 ppb, in case of insufficient toxicological data; 50 ppb if three negative mutagenicity testes requested by EFSA4 Guidelines are available; above 50 ppb, if supported by favorable toxicological data and/or evaluation done in accordance with the EFSA Guidelines (Extract from EuPIA Guideline on Printing Inks applied to the non-food contact surface of food packaging materials and articles, September 2009).

EUPIA also provides guidelines on how to measure the potential level of migratables arising from printed matter. For inks and coatings applied to the non-food contact surface of packaging (i.e. the outer surface), whether that be to the primary packaging or secondary packaging (labels and sleeves) then the most likely route for migratable species from the ink contaminating the foodstuff is by what is known as set-off migration. This is where printed matter is stacked or reeled prior to it being filled with food. Thus, the ink on the printed side of the substrate comes into contact with what will be the food-contact surface of the package (i.e. the unprinted side) and migratable components of the ink can diffuse into this surface. When the package is then filled with foodstuff, the contaminants from the ink which have diffused into the contact-surface of the package can then leach into the food causing a potential contamination issue. Thus, any energy-curable fluid which is applied to either the primary or secondary packaging of foodstuff should not result in contamination of that foodstuff at levels exceeding the limits detailed above.

EXAMPLES

The following examples illustrate specific aspects of the present invention, and are not intended to limit the scope thereof in any respect and should not be so construed.

Methods

Ink Preparation

The inks were prepared by mixing the ink components using a Silverson type disperser for 20 minutes. The inks are suitable for inkjet printing and were prepared according to the principles laid out in WO 2014/126720, based on difunctional acrylate monomers and a low migration photoinitiator package comprising a limited concentration of polymeric photoinitiator.

Curing the Inks for Extraction Testing

The inks were applied to 36 μm Melinex S (a polyester film) at a thickness of 12 μm and then cured at 200 mJ/cm$^2$, using a Fusion UV Systems UV-Rig equipped with a medium pressure H-bulb. The belt speed was adjusted to deliver the required UV-dose of 200 mJ/cm$^2$, as measured by a calibrated International Light Technologies ILT 490 Profiling Belt Radiometer (covering the UV-A and UV-B ranges).

Assessing the Level of Extractable Photoinitiator Residues and Monomers

To determine the effectiveness of an acid or PAG to reduce the amount of cleavage type (type I) photoinitiator decomposition products during UV-curing, a 'total extraction' test was employed. This test involved soaking 30 cm$^2$ of the print in 2 ml of methanol, containing 0.025% (w/w) of hydroquinone monomethyl ether (MEHQ; stabilizer) for 24 hours at room temperature before the methanol solution was analyzed by GC-MS. The GC-MS was calibrated with known solutions of the photoinitiator products and monomers and the results are reported as ppb (parts per billion), the equivalent amount of monomer, or photoinitiator fragment, that would be present in 1 Kg of food according to the EU packaging model (where it is assumed that 600 cm$^2$ of substrate is required to package 1 Kg of food) if all the unbound monomer in the print were to migrate into and contaminate the food.

Example 1. UV-Curable Inkjet Compositions Comprising 1-[4-(2-hydroxyethoxy)-phenyl]-2-hydroxy-2-methyl-1-propane-1-one and bis(2,4,6-trimethyl-benzoyl)-phenylphosphineoxide Inventive inks 1 to 3, and comparative ink 1 were prepared as pigmented ink compositions according to the formulations shown in Table 1. Amounts are wt %, based on the total weight of the composition.

TABLE 1

Inventive inks 1 to 3 and comparative ink 1

| Material | Comp. Ex 1 | Inv. Ex 1 | Inv. Ex 2 | Inv. Ex 3 |
|---|---|---|---|---|
| VEEA | 25.0 | 25.0 | 25.0 | 25.0 |
| 3-MePDDA | 25.0 | 25.0 | 25.0 | 25.0 |
| DPGDA | 18.0 | 16.0 | 16.0 | 14.0 |
| SR9035 | 7.5 | 7.5 | 7.5 | 7.5 |
| DiTMPTA | 7.5 | 7.5 | 7.5 | 7.5 |
| Acrylated Amine | 2.5 | 2.5 | 2.5 | 2.5 |
| Irgacure 819 | 2.5 | 2.5 | 2.5 | 2.5 |
| Irgacure 2959 | 2.0 | 2.0 | 2.0 | 2.0 |
| Omnipol TX | 1.0 | 1.0 | 1.0 | 1.0 |
| Acid Species[a] | 0 | 0 | 2.0 | 0 |
| Acid Species[b] | 0 | 2.0 | 0 | 0 |
| Acid Species[c] | 0 | 0 | 0 | 4.0 |
| Cyan Dispersion | 9.0 | 9.0 | 9.0 | 9.0 |
| Total | 100.0 | 100.0 | 100.0 | 100.0 |

VEEA = 2-(2-vinyloxyethoxy)ethyl acrylate
3-MePDDA = 3-Methylpentanediol diacrylate
DPGDA = Dipropylene glycol diacrylate
SR9035 = Ethoxylated Trimethylolpropane triacrylate, ex. Sartomer
Acrylated Amine = Photomer 4771
Irgacure 819 = Photoinitiator (ex. IGM); Bis(2,4,6-trimethylbenzoyl)-phenylphosphineoxide
Irgacure 2959 = 1-[4-(2-Hydroxyethoxy)-phenyl]-2-hydroxy-2-methyl-1-propane-1-one
Omnipol TX = Polymeric Thioxanthone Photoinitiator (ex. IGM Resins)
Cyan Dispersion = 25.0% (w/w) of Pigment 15:4, the remainder comprising dispersant, stabilizers and DPGDA.

The acid species used were:
(a) 4,4'-dimethyl-diphenyl iodonium hexfluorophosphate (a PAG)
(b) 1-{4-[(4-benzoylphenyl)sulfanyl]phenyl}-2-methyl-2-[(4-methylphenyl)sulfonyl]propan-1-one (a PAG)
(c) HEMAP (2-hydroxy ethyl methacrylate phosphate) (an organoacid)

Table 2 shows the results for the total extraction analysis, in terms of the photoinitiator decomposition products identified for the two cleavage type photoinitiators. The decomposition product of Irgacure 819 is 2,4,6-trimethylbenzaldehyde (mesitaldehyde). The decomposition product of Irgacure 2959 is 4-(2-hydroxyethoxy)benzaldehyde. The amount of extractable material is expressed as ppb (parts per billion). The degree of reduction is also expressed in parentheses as the percentage reduction.

TABLE 2

Extractable photodecomposition products
of Inv. Ex. 1 to 3, and Comp. Ex. 1

| Example | Acid | Extractable Irgacure 819 decomposition product (ppb) | Extractable Irgacure 2959 decomposition product (ppb) |
|---|---|---|---|
| Comp. Ex. 1 | None | 37.2 | 1520 |
| Inv. Ex. 1 | 2.0% (b) | 27.9 (25%) | 1020 (33%) |
| Inv. Ex. 2 | 2.0% (a) | 3.5 (91%) | 63.6 (96%) |
| Inv. Ex. 3 | 4.0% (c) | 4.6 (88%) | 91.4 (94%) |

It is clear from the data in Table 2 that all the acid species elicited a significant reduction in the amount of photodecomposition products produced by the two cleavage type photoinitiators used in the formulation of the inkjet composition.

Example 2. UV-Curable Inkjet Inks Containing Low Migration Cleavage Type Photoinitiators A second series of ink compositions was prepared using the (a) and (b) PAGs previously described. In this series of experiments cleavage type photoinitiators recommended for use in low migration applications were assessed. Again, the extraction analysis method was used to determine the amount of photoinitiator decomposition products. The formulations used in this series of examples were generally those of Comp. Ex. 1 and Inv. Ex. 1 to 3, except that 2.0% Omnipol TX (rather than 1.0%) was used, and the additional cleavage type photoinitiators as shown in Table 3. The PAG and amount used is also shown in Table 3. The amount of extractable material is expressed as ppb (parts per billion). The degree of reduction is also expressed in parentheses as the percentage reduction.

TABLE 3

Formulations and extractable photodecomposition
products of Inv. Ex. 1 to 3, and Comp. Ex. 1

| Example | Additional Type I PI (3.0% (w/w)) | PAG % | Extractable Irgacure 819 decomposition product (ppb) | Extractable Type I PI decomposition product (ppb) |
|---|---|---|---|---|
| Comp. Ex. 2 | — | — | 128 | — |
| Comp. Ex. 3 | KIP160 | — | 103 | 710 |
| Comp. Ex. 4 | Irgacure 127 | — | 123 | 450 |
| Inv. Ex. 4 | — | 2.0% (a) | 11.4 (91%) | — |
| Inv. Ex. 5 | — | 3.0% (b) | 58.7 (54%) | — |
| Inv. Ex. 6 | KIP160 | 2.0% (a) | 11.2 (89%) | 27.5 (96%) |
| Inv. Ex. 7 | Irgacure 127 | 2.0% (a) | 12.5 (90%) | 10.1 (98%) |
| Inv. Ex. 8 | KIP160 | 3.0% (b) | 12.0 (88%) | 222 (69%) |
| Inv. Ex. 9 | Irgacure 127 | 3.0% (b) | 13.3 (89%) | 220 (51%) |

KIP160 = Esacure KIP160, ex. IGM Resins, a difunctional α-hydroxyalkylphenone photoinitiator
Irgacure 127 = a difunctional α-hydroxyalkylphenone photoinitiator, ex. IGM Resins The formulations of the inks in Table 3 are as follows:
Comp. Ex. 2=same as Comp. Ex. 1, except Irgacure 2959 was removed, and 2% DPGDA was added.
Comp. Ex. 3=same as Comp. Ex. 2, except 3% KIP160 was added, and 3% DPGDA was removed.
Comp. Ex. 4=same as Comp. Ex. 2, except 3% Irgacure 127 was added, and 3% DPGDA was removed.
Inv. Ex. 4=same as Comp. Ex. 2, except 2% PAG was added, and 2% DPGDA was removed.
Inv. Ex. 5=same as Comp. Ex. 2, except 2% PAG was added, and 2% DPGDA was removed.
Inv. Ex. 6=same as Comp. Ex. 3, except 2% PAG was added, and 2% DPGDA was removed.
Inv. Ex. 7=same as Comp. Ex. 4, except 2% PAG was added, and 2% DPGDA was removed.
Inv. Ex. 8=same as Comp. Ex. 3, except 2% PAG was added, and 2% DPGDA was removed.
Inv. Ex. 9=same as Comp. Ex. 4, except 2% PAG was added, and 2% DPGDA was removed.

It is clear from the data in Table 3 that the use of either of the PAGs, 4,4'-dimethyl-diphenyl iodonium hexafluorophosphate (a), or 1-{4-[(4-benzoylphenyl)sulfanyl]phenyl}-2-methyl-2-[(4-methylphenyl) sulfonyl]propan-1-one (b), had a significant effect on the reduction of the main photodecomposition products from the various cleavage type photoinitiators used, detected by GC-MS analysis. The Irgacure 819 (Bis(2,4,6-trimethylbenzoyl)-phenylphosphineoxide) decomposition product of concern is mesitaldehyde, and the decomposition products identified for KIP160 and Irgacure 127 are likely to be aldehydes resulting from decomposition of the parent photoinitiator. PAG (a) is seemingly the most effective in reducing the amount of photoinitiator decomposition products. However, a surprising finding is that the amount of mesitaldehyde generated by Irgacure 819 with PAG (b) is further lowered in the presence of either KIP160 or Irgacure 127. It is a further aspect of the invention to cover coating and ink compositions comprising all three elements of an acylphosphine oxide photoinitiator, a PAG of the ketosulphone type, and an α-hydroxyalkylphenone type photoinitiator. Not only has the use of acids to reduce the amount of cleavage type photoinitiator decomposition products not been revealed in the prior art, the further advantageous combination of PAGs of the ketosulphone type, as exemplified by 1-{4-[(4-benzoylphenyl)sulfanyl]phenyl}-2-methyl-2-[(4-methylphenyl) sulfonyl] propan-1-one here, in combination with α-hydroxyalkylphenone photoinitiators to gain a further lowering in the amount of decomposition products from acylphosphine oxide photoinitiators has also not been disclosed in the identified prior art. Clearly, this surprising finding is very advantageous as it enables the dramatic lowering of low molecular weight acylphosphine oxide decomposition products, such as mesitaldehyde (molecular weight=148), where the use of PAG (b) type acid generators is preferable to cationic photoinitiators of the PAG (a) type, for example for applications requiring low migration.

An obvious benefit from the inclusion of either of the α-hydroxyalkylphenone photointiators in compositions containing an acylphosphine oxide and an acid is that they produce a significant reduction in the amount of uncured monomer present in the UV-cured ink films, clearly desirable for low migration applications.

The present invention has been described in detail, including the preferred embodiments thereof. However, it will be appreciated that those skilled in the art, upon consideration of the present disclosure, may make modifications and/or improvements on this invention that fall within the scope and spirit of the invention.

What is claimed is:

1. A UV-curable ink or coating composition, comprising:
   a) one or more photopolymerizable monomers and/or oligomers;
   b) one or more cleavage type photoinitiators; and
   c) one or more acids;
   wherein the one or more acids are selected from the group consisting of an inorganic or organic acid, a photoacid generator, and combinations thereof;
   wherein the inorganic or organic acid is selected from the group consisting of a phosphoric acid, phosphoric acid derivatives, a sulphonic acid, sulphonic acid derivatives, and combinations thereof;
   wherein the composition comprises less than or equal to 5% (w/w) of monofunctional monomers, based on the total weight of the composition;
   wherein the one or more acids do not inhibit polymerization; and
   wherein:
   i. during UV-curing, the cleavage type photoinitiator produces one or more decomposition products;
   ii. at least one decomposition product is an aldehyde or a ketone; and
   iii. the amount of aldehyde or ketone decomposition products is reduced, compared to a similar composition containing cleavage type photoinitiator but no acid, by an amount according to the following equation:

$$X=100\times((AD_0-AD_a)/AD_0) \geq 10.00$$

wherein
X is the percent reduction of decomposition products;
$AD_0$ is the amount of decomposition products produced during UV-cure of the composition containing a cleavage type photoinitiator, but without the acid; and
$AD_a$ is the amount of decomposition products produced during UV-cure of the composition containing a cleavage type photoinitiator and an acid.

2. The composition of claim 1, wherein the one or more cleavage type photoinitiators are selected from the group consisting of benzoin ethers, benzyl ketals, α-dialkoxy-aceto-phenones, α-hydroxyalkyl-phenones, α-aminoalkyl-phenones, acyl-phosphine-oxides, and combinations thereof.

3. The composition of claim 1, wherein at least one cleavage type photoinitiator is an α-hydroxyalkyl-phenone cleavage type photoinitiator; and/or wherein at least one cleavage type photoinitiator is an acylphosphine oxide cleavage type photoinitiator.

4. The composition of claim 1, wherein at least one photoacid generator is a cationic photoinitiator or a ketosulphone photoinitiator.

5. The composition of claim 1, wherein the acid further comprises one or more acrylate, methacrylate, vinyl, or acrylamide groups.

6. The composition of claim 1, wherein the photoacid generator derived acid is selected from the group consisting of $HPF_6$ (hexafluorophosphoric acid), $HSbF_6$ (hexafluoroantimonic acid), $HAsF_6$ (hexafluoroasenic acid), $HB(C_6F_5)_4$ (tetrakis(pentafluorophenyl)boronic acid), toluenesulphonic acid, and combinations thereof.

7. The composition of claim 4, wherein the ketosulphone photoinitiator is 1-{4-[(4-benzoylphenyl)sulfanyl]phenyl}-2-methyl-2-[(4-methylphenyl)sulfonyl]propan-1-one.

8. The composition of claim 1, wherein the cleavage type photoinitiator is present in an amount of 0.1% (w/w) to 10% (w/w), based on the total weight of the composition; and/or when at least one acid is an organic acid, the organic acid is present in an amount of 0.1% (w/w) to 10% (w/w), based on the total weight of the composition; and/or when at least one acid is produced by a photoacid generator, the photoacid generator is present in an amount of 0.1% (w/w) to 10% (w/w), based on the total weight of the composition; and/or wherein the total amount of all photopolymerizable monomers and/or oligomers in the composition is 30% (w/w) to 95% (w/w), based on the total weight of the composition.

9. The composition of claim 1, further comprising a UV sensitizer.

10. The composition of claim 9, wherein the UV sensitizer is selected from the group consisting of any thioxanthone, anthracene, naphthalenes, and perylene, or combinations thereof.

11. The composition of claim 10, wherein the thioxanthone sensitizer is multifunctional, polymeric, or polymerizable.

12. The composition of claim 1, wherein at least one decomposition product is an aldehyde, and wherein the amount of aldehyde decomposition products is reduced by an amount according to the following equation:

$$X=100\times((AD_0-AD_a)/AD_0) \geq 10.00$$

wherein
- X is the percent reduction of aldehyde decomposition products;
- $AD_0$ is the amount of aldehyde decomposition products produced during UV-cure of the composition containing a cleavage type photoinitiator, but without the acid; and
- $AD_a$ is the amount of aldehyde decomposition products produced during UV-cure of the composition containing a cleavage type photoinitiator and an acid.

13. A method for preparing a printed substrate having a reduced amount of extractable materials, comprising applying one or more ink or coating compositions of claim 1 to the substrate, and curing the ink or coating compositions under the actions of UV radiation.

14. The method of claim 13, wherein the extractable material is a decomposition product produced by the cleavage type photoinitiator during UV-curing of the ink or coating composition applied on the substrate.

15. The method of claim 13, wherein at least one extractable material is an aldehyde or a ketone, and the amount of aldehyde or ketone extractable materials is reduced when compared to a substrate printed with a similar ink or coating containing a cleavage type photoinitiator but no acid, and wherein the amount of aldehyde or ketone extractable materials is reduced by an amount according to the following equation:

$$X = 100 \times ((AD_0 - AD_a)/AD_0) \geq 10.00$$

wherein
- X is the percent reduction of aldehyde or ketone decomposition products;
- $AD_0$ is the amount of aldehyde or ketone decomposition products produced during UV-cure of the composition containing a cleavage type photoinitiator, but without the acid; and
- $AD_a$ is the amount of aldehyde or ketone decomposition products produced during UV-cure of the composition containing a cleavage type photoinitiator and an acid.

16. A printed substrate prepared by the method of claim 13.

* * * * *